United States Patent
Lee et al.

(10) Patent No.: US 8,560,322 B2
(45) Date of Patent: Oct. 15, 2013

(54) MOBILE TERMINAL AND METHOD OF CONTROLLING A MOBILE TERMINAL

(75) Inventors: In Jik Lee, Seoul (KR); Jong Keun Youn, Gunpo-si (KR); Dae Sung Jung, Seoul (KR); Jae Min Joh, Anyang-si (KR); Sun Hwa Cha, Seoul (KR); Seung Heon Yang, Seoul (KR); Jae Hoon Yu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 691 days.

(21) Appl. No.: 12/827,716

(22) Filed: Jun. 30, 2010

(65) Prior Publication Data

US 2010/0332226 A1 Dec. 30, 2010

(30) Foreign Application Priority Data

Jun. 30, 2009 (KR) .................. 10-2009-0059118
Jun. 30, 2009 (KR) .................. 10-2009-0059119

(51) Int. Cl.
 *G10L 21/00* (2013.01)
(52) U.S. Cl.
 USPC ............ 704/275; 704/270; 704/270.1
(58) Field of Classification Search
 USPC ................................. 704/270–275
 See application file for complete search history.

(56) References Cited

U.S. PATENT DOCUMENTS

| | | | | |
|---|---|---|---|---|
| 5,926,811 | A * | 7/1999 | Miller et al. | 707/748 |
| 7,324,990 | B2 * | 1/2008 | Jaschek et al. | 1/1 |
| 7,574,453 | B2 * | 8/2009 | Julia et al. | 1/1 |
| 2003/0149727 | A1 * | 8/2003 | Jaschek et al. | 709/206 |
| 2006/0195445 | A1 * | 8/2006 | Julia et al. | 707/6 |
| 2007/0263266 | A1 * | 11/2007 | Har'el et al. | 358/527 |
| 2009/0094189 | A1 * | 4/2009 | Stephens | 707/2 |
| 2009/0210226 | A1 * | 8/2009 | Ma | 704/236 |
| 2009/0271380 | A1 * | 10/2009 | Julia et al. | 707/3 |
| 2009/0313010 | A1 * | 12/2009 | Burckart et al. | 704/227 |
| 2010/0211860 | A1 * | 8/2010 | O'Dell-Alexander | 715/205 |
| 2011/0010497 | A1 * | 1/2011 | Bryant-Rich et al. | 711/115 |
| 2013/0031097 | A1 * | 1/2013 | Sutter et al. | 707/737 |

* cited by examiner

*Primary Examiner* — Douglas Godbold
(74) *Attorney, Agent, or Firm* — Birch, Stewart, Kolasch & Birch, LLP

(57) ABSTRACT

A mobile terminal and controlling method thereof are disclosed, by which a specific content and another content associated with the specific content can be quickly searched using a user's voice. The present invention includes inputting a voice for a search for a specific content provided to the mobile terminal via a microphone, analyzing a meaning of the inputted voice, searching a memory for at least one content to which a voice name having a meaning associated with the analyzed voice is tagged, and displaying the searched at least one content.

21 Claims, 29 Drawing Sheets

FIG. 7
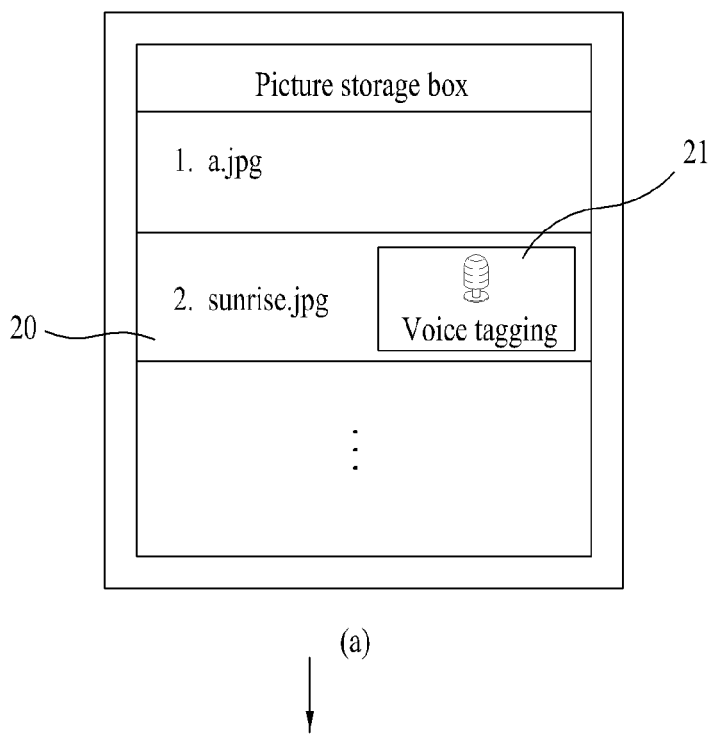
(a)
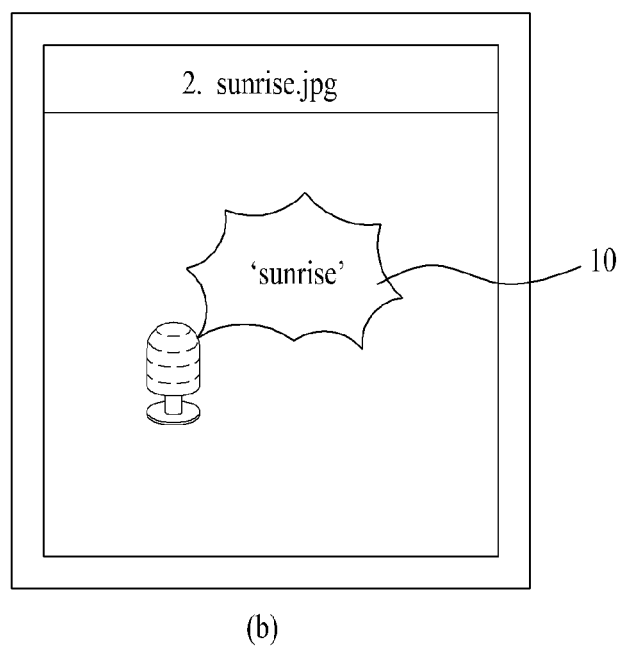
(b)

FIG. 23
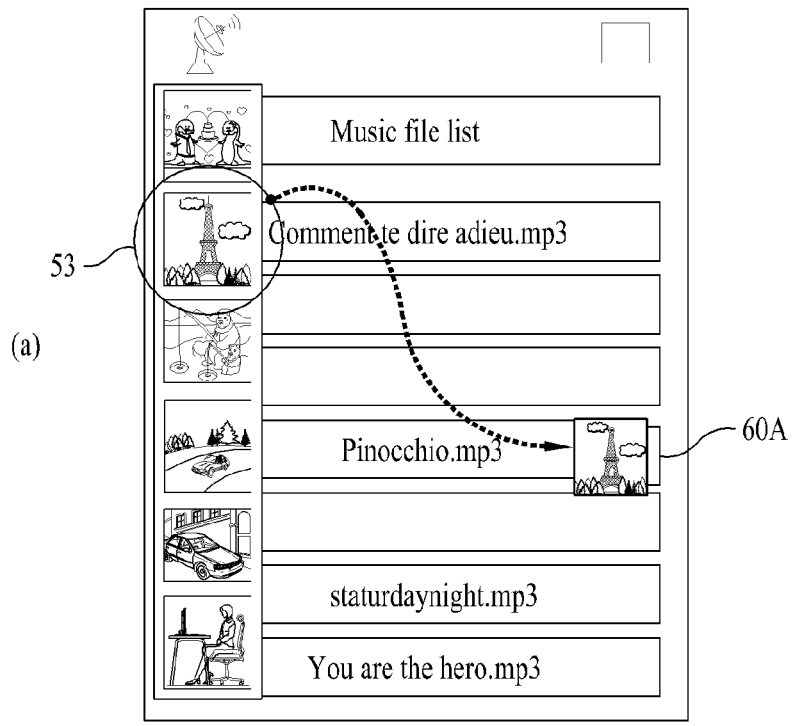
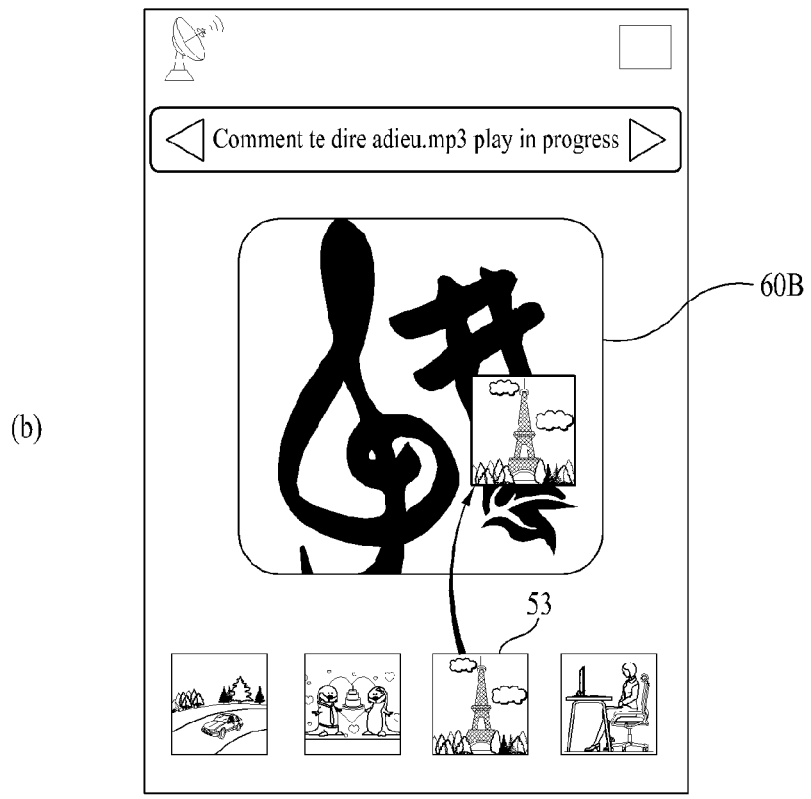

FIG. 30
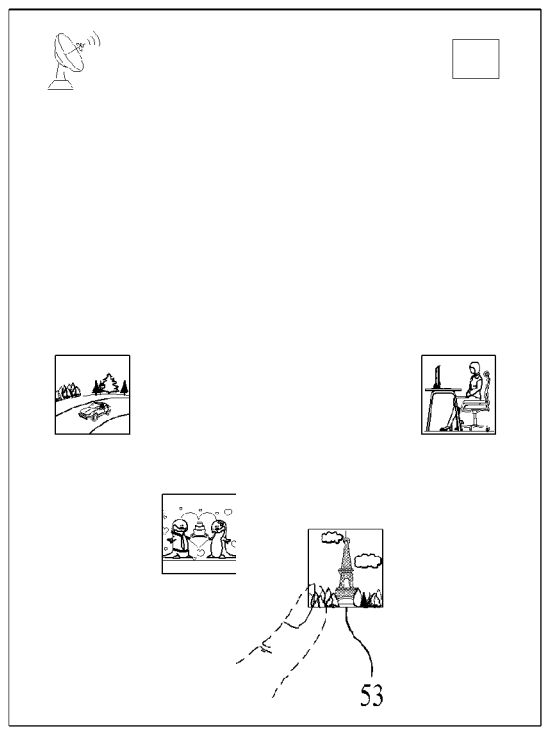
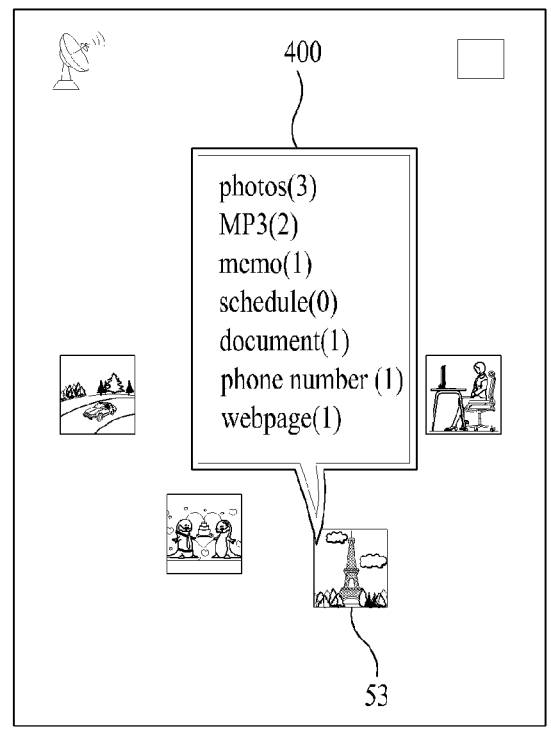
(a)  (b)

MOBILE TERMINAL AND METHOD OF CONTROLLING A MOBILE TERMINAL

Pursuant to 35 U.S.C. §119(a), this application claims the benefit of earlier filing date and right of priority to Korean Application No. 10-2009-0059119, filed on Jun. 30, 2009, and 10-2009-0059118 filed on Jun. 30, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The above-configured mobile terminal provides a user with a multimedia function capable of executing files of various formats including a camera function, a music play function, a video play function, a document function and the like.

However, it is inconvenient for a user to search the mobile terminal for a specific file and files associated with the specific file one by one.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a specific content can be quickly searched using a user's voice and by which a content associated with the voice can be quickly searched as well.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a microphone, a memory configured to store at least one content having at least one voice name tagged thereto, and a controller configured to analyze a voice for a specific content search is inputted via the microphone, to search the memory for at least one content to which a voice name having a meaning associated with the analyzed voice is tagged, and to display the searched at least one content on the display unit.

In another aspect of the present invention, a method of controlling a mobile terminal according to the present invention includes the steps of inputting a voice for a search for a specific content via a microphone of the mobile terminal, analyzing a meaning of the inputted voice, searching a memory of the mobile terminal for at least one content to which a voice name having a meaning associated with the analyzed voice is tagged, and displaying the searched at least one content.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 6 to 11 are diagrams for screen configurations of a process for tagging a voice name to video data according to a second embodiment of the present invention;

FIGS. 21 to 28 are diagrams for screen configurations of a process for tagging a UI object tagged voice name to a content according to a third embodiment of the present invention;

FIG. 30 is a diagram for screen configuration of a process for searching and displaying a voice name tagged content using a UI object according to a third embodiment of the present invention;

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
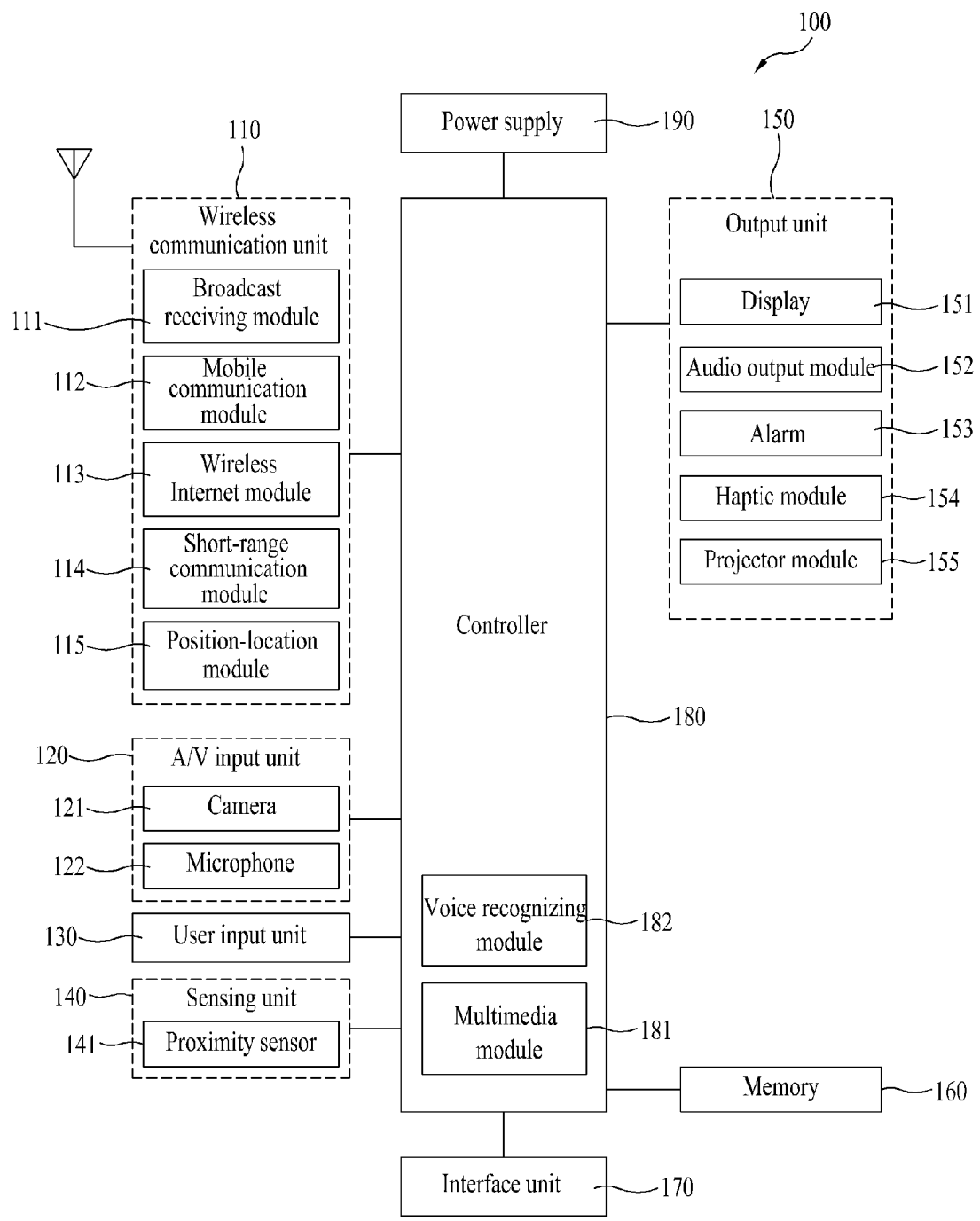
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122.

The camera 121 possesses a digital zoom and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

Moreover, the memory 160 is provided with a voice recognizing database and a thesaurus database according to the present invention.

Data corresponding to a user' voice recognized by a voice recognizing module 182 is stored in the voice recognizing database.

In this case, the voice data includes an original voice data inputted by a user or can include voice feature vector values for the original voice data extracted by the voice recognizing module 182.

In order to increase a storage capacity of the memory 160, the present invention can store the voice feature vector value extracted from the original voice data only instead of storing the whole original voice data.

The thesaurus database is a dictionary containing a plurality of words and can include synonyms, antonyms, hypernyms, hyponyms, etc.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A voice recognizing module 182 recognizes user's voice inputted via the microphone 122 by driving a voice recognizing engine having voice recognition algorithm applied thereto.

In particular, the voice recognizing module 182 converts the user's voice inputted via the microphone 122 to digital data and then pre-emphasizes the digital data.

Subsequently, the voice recognizing module 182 extracts voice feature vector values of the digital-converted voice. And, a voice recognition database provided to the memory 160n informs the controller 180 of the operation that matches the extracted voice feature vector values.

In this case, the voice feature vector values can include at least one of a waveform of the voice, a format of the voice and a pitch of the voice.

For instance, if the operation matching the voice feature vector value extracted from the voice recognition database by the voice recognizing module 182 is 'phonebook', the controller 180 executes a phonebook menu function and displays a phonebook menu on a screen of the display 151.

If the operation matching the voice feature vector value extracted from the voice recognition database by the voice recognizing module 182 is 'text', the controller 180 drives a text viewer application for displaying the 'text' and displays a text viewer image on a screen of the display 151.

Under the control of the controller 180, the voice recognizing module 182 recognizes correspondent party's voice inputted via the microphone 122 by driving a voice recognition engine having voice recognition algorithm applied thereto and then tags the recognized voice to a voice name of a content selected by a user or a voice name of a UI object selected by the user.

In this case, the content includes all data executable within the mobile terminal such as a photo or video photographed by the camera 121, a music file, a document file, an image file, a video file, a memo file, a schedule file and the like.

The above-configured voice recognizing module 182 is provided as a module or unit to the mobile terminal 100 or can be provided as software to the memory 160.

The voice recognizing module 182 can be provided within the controller 180. In this case, the controller 180 is able to identically perform operations of the voice recognizing module 182.

In the following description, assume that the voice recognizing module 182 is provided within the controller 180 and the controller 180 identically performs operations of the voice recognizing module 182.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
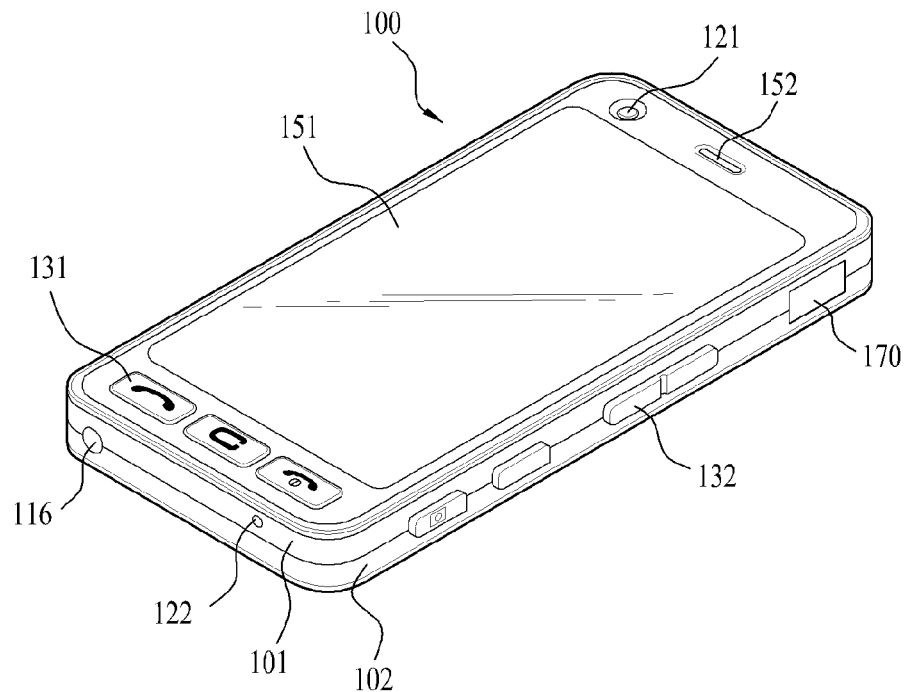
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
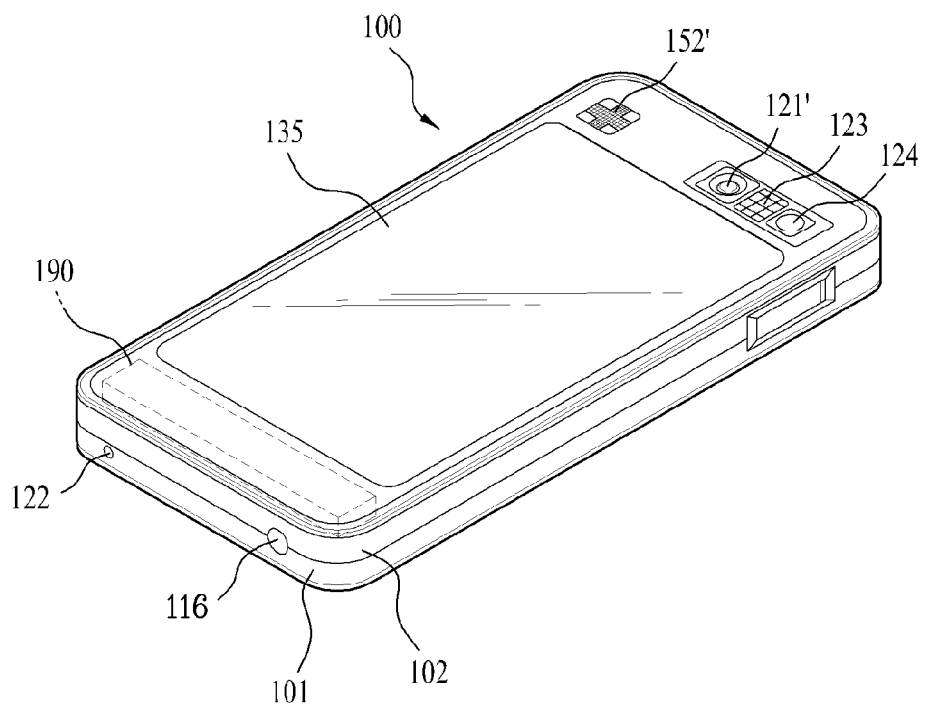
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, a process for searching and displaying a content provided to a mobile terminal using a user voice according to each embodiment of the present invention is explained in detail with reference to the accompanying drawings.

First of all, a process for tagging a voice inputted by a user to a voice name of a content and, if a voice for a content search is inputted by a user, searching and displaying a content, to which a voice name associated with the inputted voice is tagged, is explained in detail with reference to FIGS. 3 to 7 as follows.

<First Embodiment>

Figure 3:
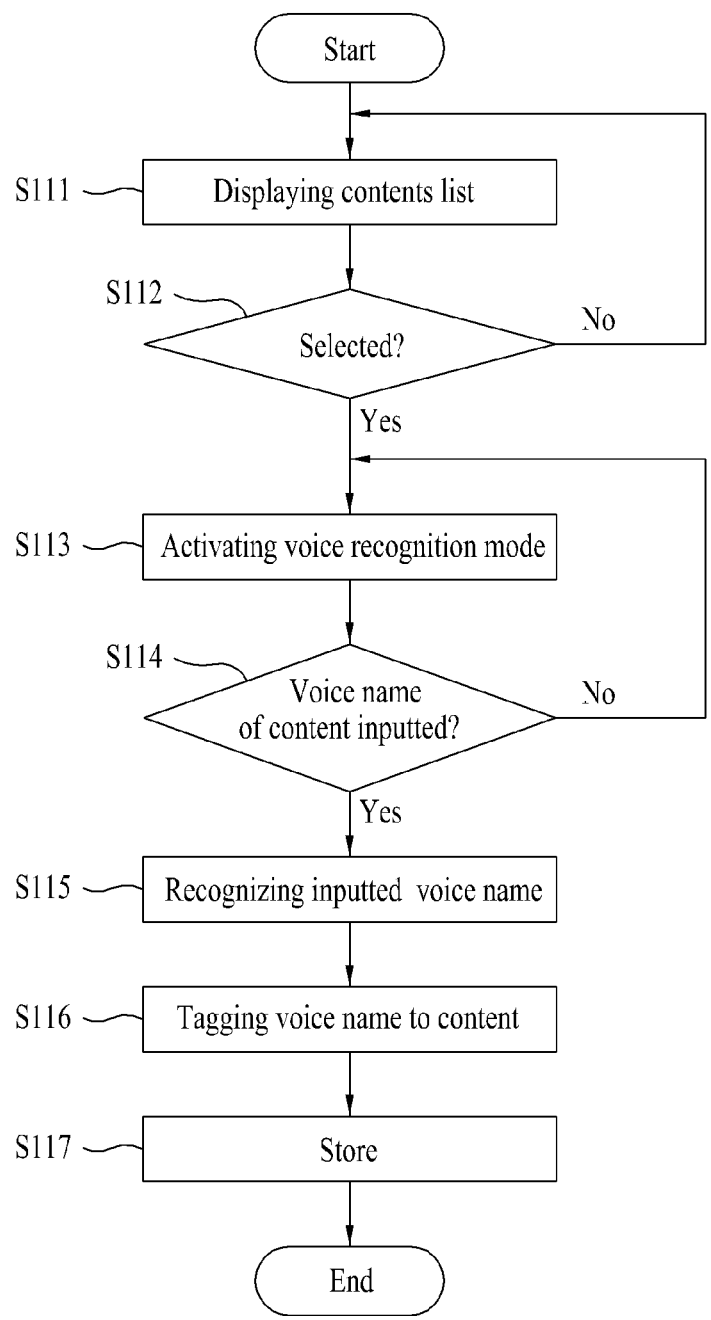
FIG. 3 is a flowchart of a process for setting a voice name of a content according to a first embodiment of the present invention.

FIG. 3 is a flowchart of a process for setting a voice name of a content according to a first embodiment of the present invention.

Referring to FIG. 3, while a plurality of contents are displayed on the display unit 151 [S111], if at least one content is selected by a user through the user input unit 130 or the touchscreen 151 [S112], the controller 180 of the mobile terminal 100 activates a voice recognizing mode and drives the microphone 122 to receive an input of a voice name of the selected content and the voice recognizing module 182 configured to recognize a voice inputted via the microphone 122 [S113].

In this case, the contents of the present invention can include a photo/video taken via the camera 121, a document file, an image file, a received message, contact information within a phonebook, an audio file, a game file, a schedule file, a text file, an e-dictionary file, a calculator file, webpage address information, and the like. In particular, the contents include all data existing in the menu function of the mobile terminal 100 according to the present invention. And, the contact information can include a mobile phone number, name, home phone number, email address and the like of a correspondent party.

Meanwhile, when a voice name of the selected content is inputted via the microphone 122 [S114], the controller 180 recognizes the voice name by controlling the voice recognizing module 182 [S115], tags the recognized voice name to the selected content [S116], and then stores it in the memory 160 [S117].

In doing so, in order to manage the memory 160 more efficiently, the controller 180 can store feature vector values of the recognized voice name in the memory 160 instead of storing the whole file of the recognized voice name in the memory 160.

If the voice name is tagged to the content, the controller 180 is able to display an indicator indicating that the voice name is tagged to the content. In this case, the indicator can be displayed as a UI or GUI of a 2D or 3D icon type.

When the indicator is displayed on the content, if the indicator is selected, the controller 180 outputs the voice name tagged to the content to the audio output module 152. Alternatively, the controller 180 converts the voice name to a text and then displays the corresponding text.

If the voice name is tagged to the content, the controller 180 can additionally receive an input of a voice, which will be used as a voice memo of the content, from a user via the microphone 122.

In particular, once the voice is inputted to be used as the voice memo, the controller 180 recognizes the inputted voice via the voice recognizing module 182 and then sets the voice memo of the content to the recognized voice.

The controller 180 converts a content of the voice memo additionally tagged to the content to a text and is then able to additionally tag the converted text to the text memo of the content.

Contents of the voice memo additionally tagged to the content and the text memo are usable in searching the content using the user's voice.

If the voice name, which will be tagged to the selected content, is recognized, the controller 180 searches a thesaurus database provided to the memory 160 for at least one word having the meaning associated with the recognized voice name.

The controller 180 is able to store the words searched from the thesaurus database in a manner of tagging the words to the content additionally.

For instance, if the voice name of the selected name is 'mp3', the controller 180 is able to tag such a word having the meaning associated with the voice name 'mp3' within the thesaurus database as 'mp4', 'wma', 'wave' and the like to the content in addition.

Moreover, the controller 180 tags the searched words to the content in audio format or can tag the searched word to the content in text format.

Figure 4:
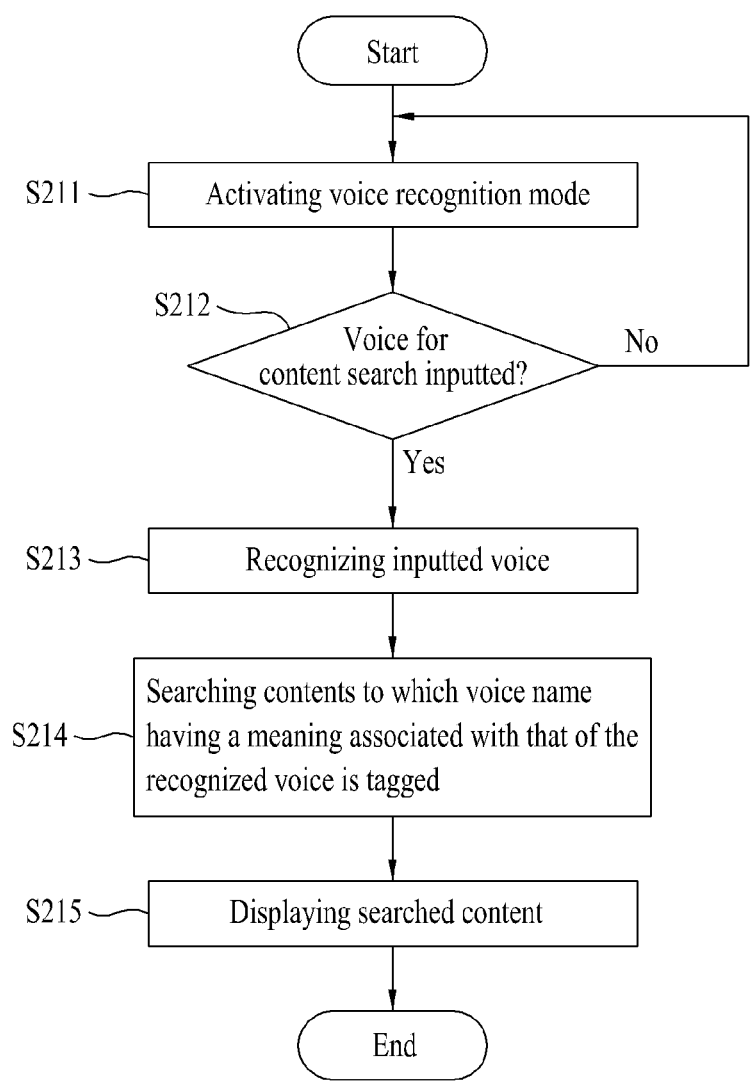
FIG. 4 is a flowchart of a process for searching and displaying a voice name tagged content according to a first embodiment of the present invention.

FIG. 4 is a flowchart of a process for searching and displaying a voice name tagged content according to a first embodiment of the present invention.

Referring to FIG. 4, while the content, to which the voice name is tagged by the process shown in FIG. 3, is stored in the memory 160, if a command for searching the voice name tagged content is inputted via the user input unit 130 or the touchscreen 151, the controller 180 activates the voice recognition mode and drives the microphone configured to receive an input of a voice for the content search from a user and the voice recognizing module 182 configured to recognize the voice inputted via the microphone 122 [S211].

If the voice for the content search is inputted via the microphone 122 [S212], the controller 180 recognizes the meaning of the inputted voice via the voice recognizing module 182 [S213].

The controller 180 searches the contents stored in the memory 160 for at least one content to which the voice name having the associated meaning of the recognized voice is tagged [S214].

In particular, the controller 180 is able to search the memory 160 for the content to which the voice name matching the meaning of the recognized voice is tagged.

The controller 180 searches the thesaurus database provided within the memory 160 for the at least one word having the meaning associated with the recognized voice and is able to find at least one content, to which the voice name matching the meaning of the searched word is tagged, from the contents.

If the content, to which the voice name having the meaning associated with the recognized voice, is searched from the memory 160, the controller 180 displays the searched content on a screen of the display unit 151 [S215].

For instance, if the voice for the content search is 'mp3', the controller 180 is able to search the memory 160 for the content to which the same voice name of the 'mp3' is tagged. If the voice for the content search is 'mp3', the controller 180 searches the thesaurus database for the words having the meanings of 'mp3', 'wave', 'wma' and the like, which are the words associated with the 'mp3', and is then able to search the contents stored in the memory 160 for the contents to which the voice names having the meanings of the 'mp3', 'wave', 'wma' and the like are tagged.

In doing so, if the number the searched contents is plural, the controller 180 is able to display the searched contents on the screen in a manner of discriminating the searched contents from each other according to one of priority previously set by a user, frequency of use, significance and the like.

In the following description, when a content of the present invention is a video data taken via the camera 122, a process for setting a voice name of the video data and a process for searching the video data according to a second embodiment of the present invention are explained in detail Of course, the content of the present invention is non-limited by the video data.

<Second Embodiment>

First of all, a process for tagging a voice name to a video data inputted from the camera 121 is explained in detail with reference to FIGS. 5 to 11 as follows.

Figure 5:
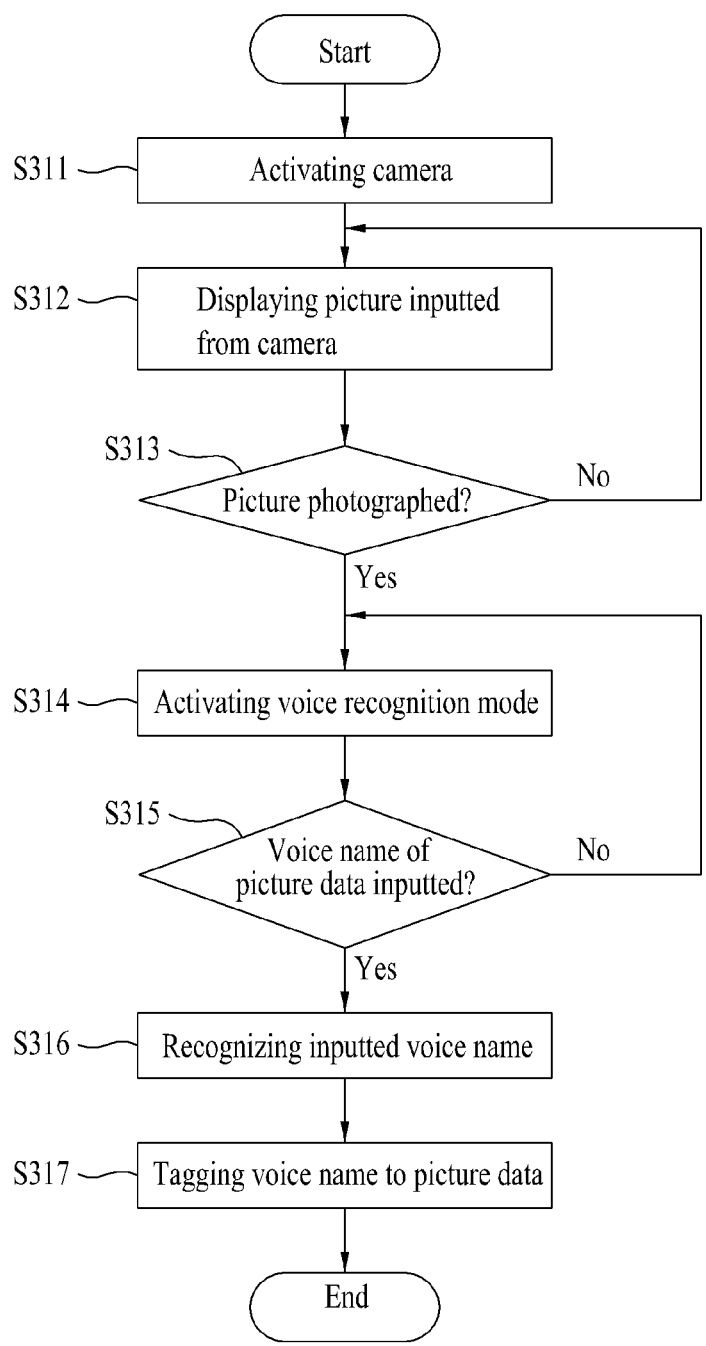
FIG. 5 is a flowchart of a process for tagging a voice name to video data according to a second embodiment of the present invention.

FIG. 5 is a flowchart of a process for tagging a voice name to video data according to a second embodiment of the present invention.

FIGS. 6 to 11 are diagrams for screen configurations of a process for tagging a voice name to video data according to a second embodiment of the present invention.

Figure 6:
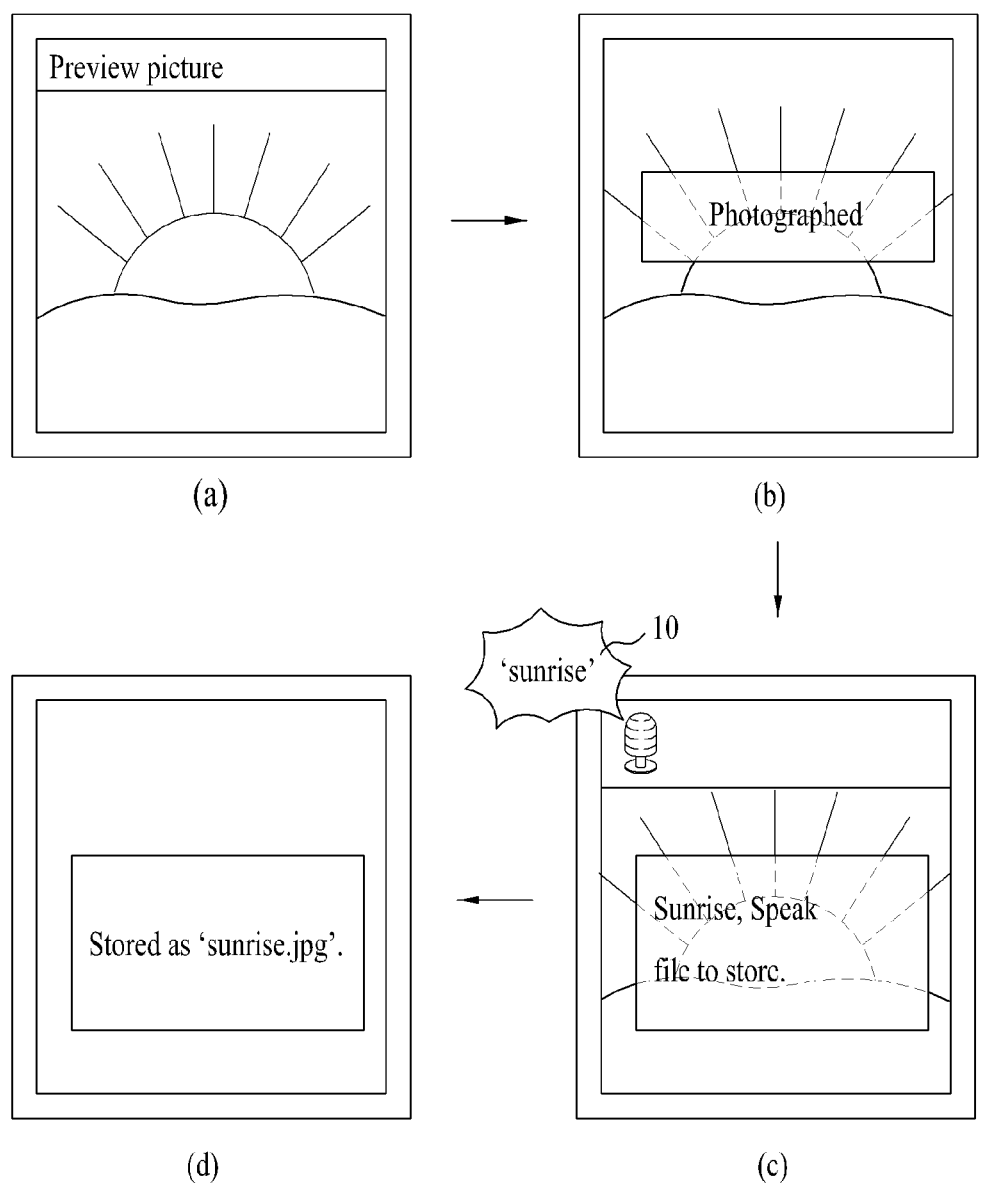

Referring to FIGS. 5 to 11, if a user selects a camera menu, the controller 180 of the mobile terminal 100 activates the camera 121 [S311] and then displays a picture of an object inputted from the camera 121 on the display unit 151 [S312] [FIG. 6 (a)].

If a command signal for a picture photographing is inputted by a user via the user input unit 130 or the touchscreen 151 [S313], the controller 180 photographs the picture, as shown in FIG. 6 (b). In this case, the picture includes a still picture or a moving picture.

Once the picture is photographed, the controller 180 activates a voice recognizing mode as shown in FIG. 6 (c) and then activates the microphone 122 configured to receive an input of a voice name of the photographed picture data from a user and the voice recognizing module 182 [S314].

Referring to FIG. 6 (c), if the voice name ('sunrise') 10 of the photographed picture data is inputted via the microphone 122 [S315], the controller 180 recognizes the voice name ('sunrise') 10 via the voice recognizing module 182 [S316].

Referring to FIG. 6 (d), the recognized voice name ('sunrise') 10 is tagged to the photographed picture data and stored [S317].

In this case, the command signal for the picture photographing can include a half-shutter key signal generated from pressing a shutter key in half. And, the voice recognizing mode can be activated only if the half-shutter key is inputted.

In particular, when the voice recognition is always possible in photographing mode of the camera 121, the power consumption of the mobile terminal 100 increases. And, a voice recognition rate is lowered due to neighbor noise generated on the photographing of the camera 121.

According to a second embodiment of the present invention, the voice recognition mode is activated only if the half-shutter key for focusing on an object for an actual photographing is inputted. Therefore, unnecessary power consumption can be prevented and the voice recognition rate can be raised.

Once the camera 121 is activated, the controller 180 is able to directly activate the voice recognition mode. In this case, if the voice name of the picture data from the microphone 122 has a preset sound pressure, the controller 180 directly photographs the picture inputted from the camera 121, tags the voice name to the photographed picture data, and is then able to store the tagged data.

Meanwhile, referring to FIG. 7 (*a*), if the voice name 'sunrise' 10 is tagged to the picture data '2. sunrise.jpg' 20, the controller 180 is able to display an indicator 21 indicating that the voice name 'sunrise' is tagged to the '2. sunrise.jpg' 20.

In this case, an audio output function of the voice name 'sunrise' 19 tagged to the picture data 20 can be allocated to the indicator 11. If a user selects the indicator 21, the controller 180 is able to output an audio of the voice name 'sunrise' by controlling the audio output module 152, as shown in FIG. 7 (*b*).

Besides, if the indicator 21 is selected, the controller 180 converts the voice name 'sunrise' 10 to a text and is then able to display the text [not shown in the drawing].

Figure 8:
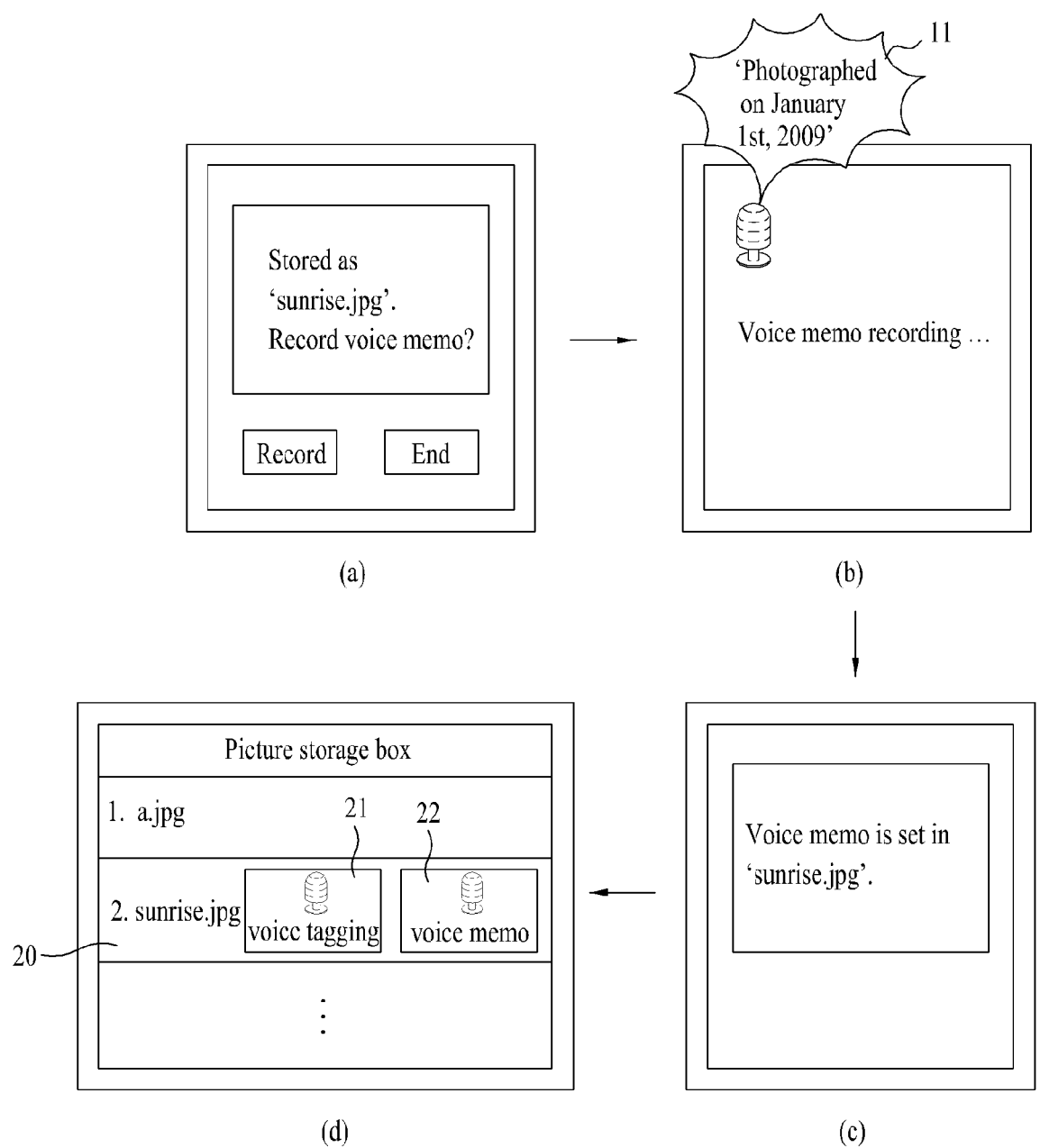

Referring to FIG. 8 (*a*), if the voice name 'sunrise' 10 is tagged to the picture data 20, the controller 180 is able to provide a user with the voice memo function of the picture data.

In particular, referring to FIG. 8 (*b*), if a voice 'photographing on Jan. $1^{st}$, 2010' 11, which will be used as a voice memo of the picture data 20, is inputted via the microphone 122, the controller 180 recognizes the inputted voice 'photographing on Jan. $1^{st}$, 2010' 11 via the voice recognizing module 182 and then sets the voice memo of the picture data 20 to the recognized voice 'photographing on Jan. $1^{st}$, 2010' 11, as shown in FIG. 8 (*c*).

In this case, referring to FIG. 8 (*d*), the controller 180 is able to display an indicator 22 indicating that the voice memo is tagged to the picture data 20.

An audio output function of the voice 'photographing on Jan. $1^{st}$, 2010' 11 set in the picture data 20 can be allocated to the indicator 22. If the indicator 22 is selected by a user, the controller 180 controls the audio output module 152 to output an audio of the content of voice 'photographing on Jan. $1^{st}$, 2010' 11.

Figure 9:
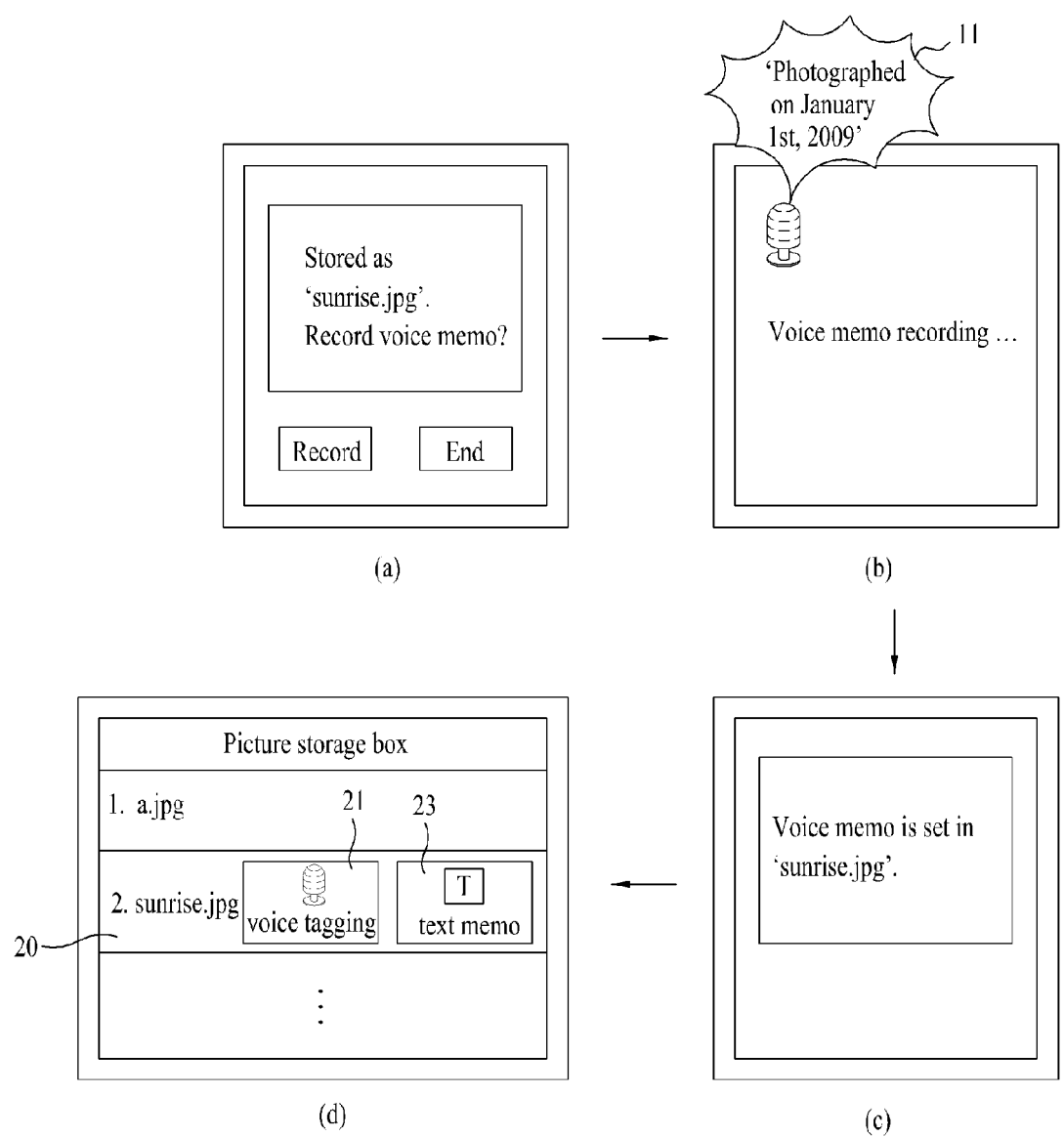

Referring to FIG. 9 (*c*), the controller converts the content of the voice 'photographing on Jan. $1^{st}$, 2010' inputted in FIG. 8 (*a*) and FIG. 8 (*b*) to a text. The controller 180 then sets a text memo of the picture data 10 to the converted text as shown in FIG. 9 (*d*).

In this case, the controller 180 is able to display a third indicator 23 indicating that the text memo is set in the picture data 10.

A display function of the text memo 'photographing on Jan. $1^{st}$, 2010' set in the picture data 10 can be allocated to the third indicator 23. If the third indicator is selected by a user, the controller 180 is able to display a content of the text memo 'photographing on Jan. $1^{st}$, 2010' on the display unit 151.

Figure 10:
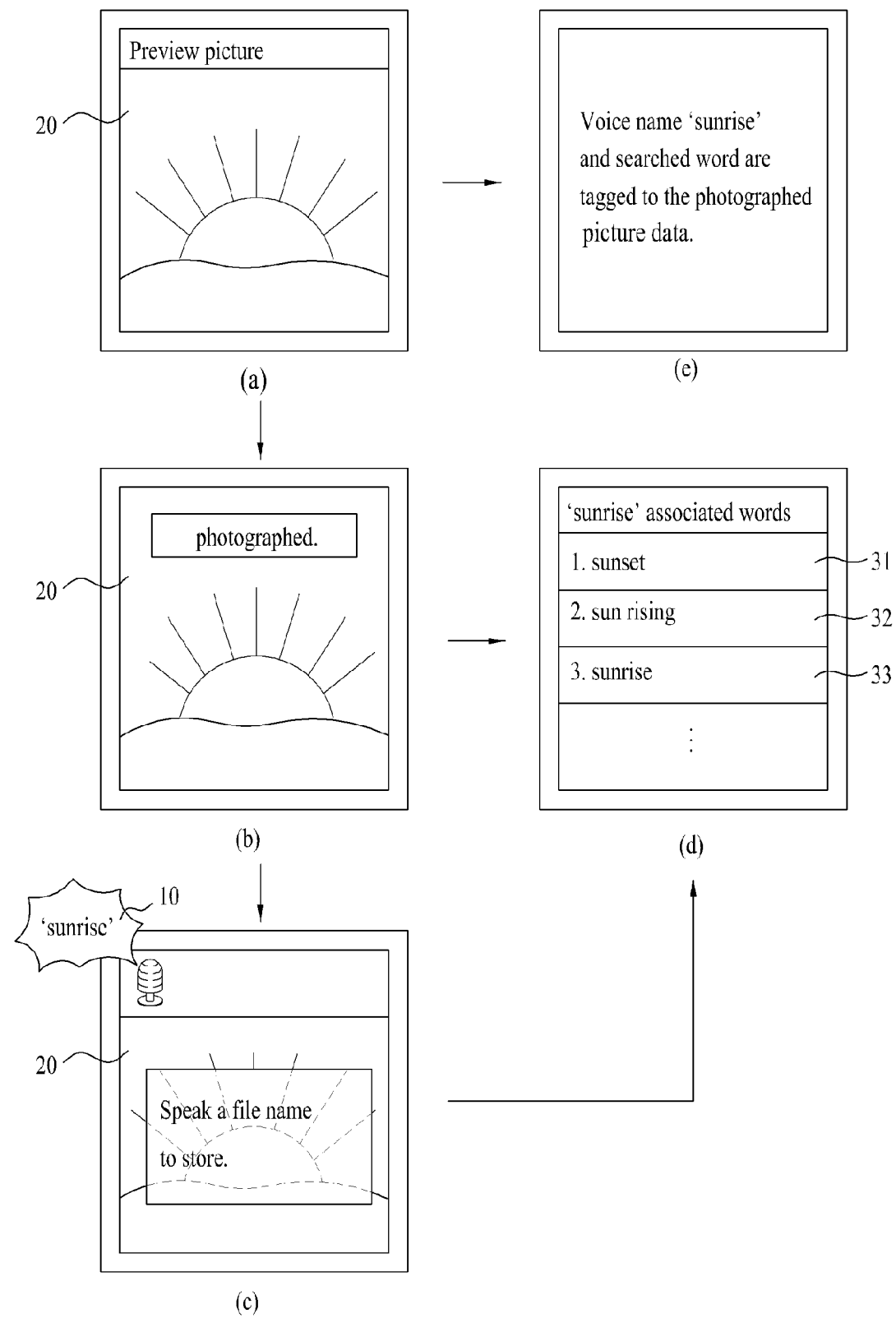

Referring to FIG. 10 (*a*) and FIG. 10 (*b*), a picture 20 inputted from the camera 121 is photographed. Referring to FIG. 10 (*c*), a voice name 'sunrise' 10, which will be tagged to the photographed picture data 20, is inputted via the microphone 122. If so, referring to FIG. 10 (*d*), the controller 180 searches the thesaurus database for at least one or more words 31 to 33 having the meanings associated with the inputted voice name 'sunrise' 10.

Subsequently, referring to FIG. 10 (*e*), the controller 180 tags the searched words 31 to 33 to the picture data 20 and then stores the picture data, to which the words 31 to 33 and the voice name ('sunrise') 10 are tagged, in the memory 160.

In this case, the words are written in attribute information of the picture data and can be then stored. If a specific one of the words written in the attribute information is selected, the controller 180 searches the memory 160 for the picture data having the selected word tagged thereto and is then able to display the picture data.

Figure 11:
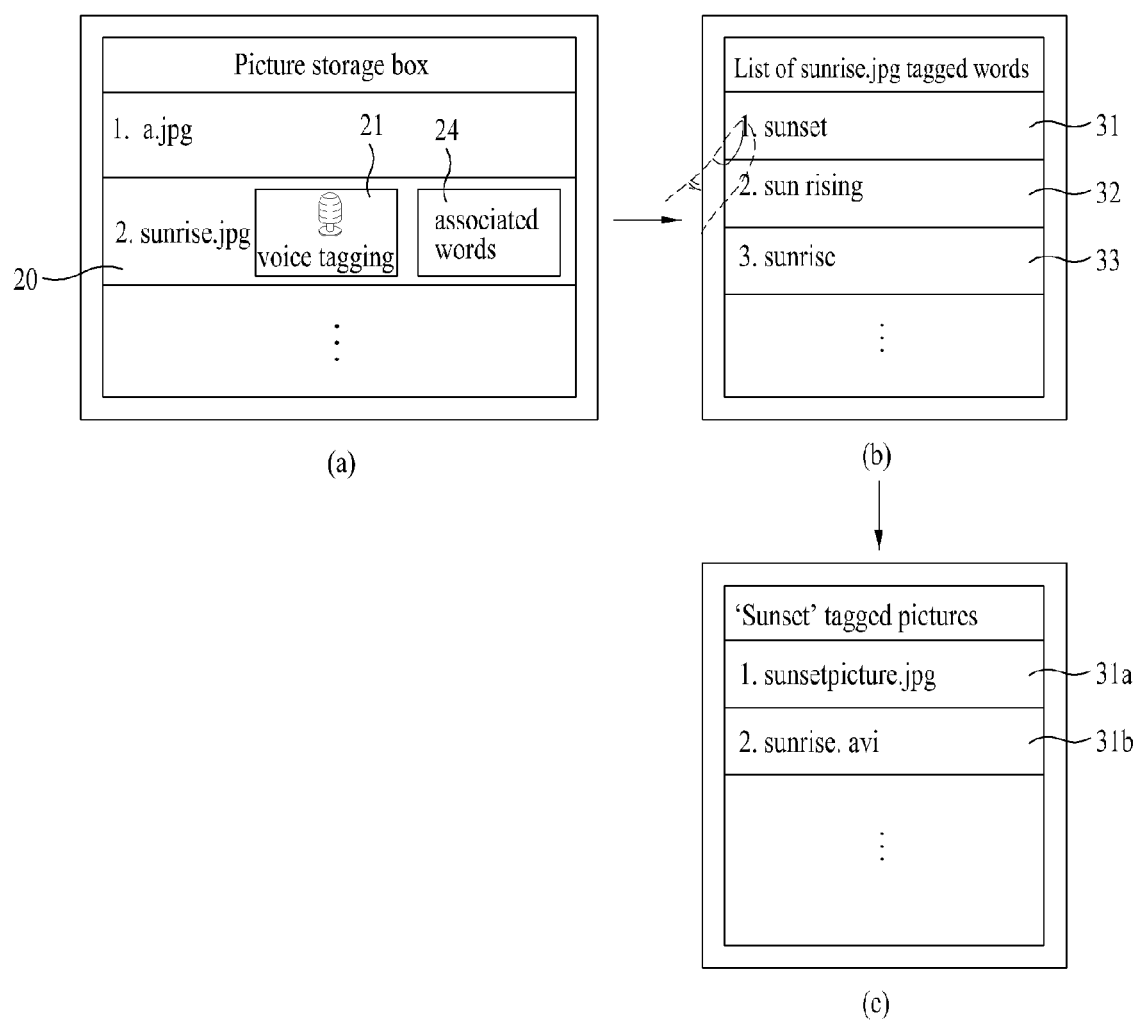

In particular, referring to FIG. 11 (*a*), once the voice name ('sunrise') 10 and the words 31 to 33 are tagged to the picture data, the controller 180 is able to display an indicator 21 indicating that the voice name ('sunrise') 10 is tagged to the picture data 20 and an indicator 24 indicating that the words 31 to 33 are tagged to the video data 20.

Referring to FIG. 11 (*b*), if the identifier 24 is selected, the controller 180 is able to display the words 31 to 33 stored in the attribute information of the picture data 20.

Referring to FIG. 11 (*c*), if '1. Sunset' 31 is selected from the words 31 to 32 by a user, the controller 180 additionally searches the memory 160 for picture data 31*a* and 31*b*, to which a voice name including the meaning of the selected word '1. Sunset' 31 is tagged, and then displays the searched data 31*a* and 31*b*.

In the above description, the process for tagging the voice name to the picture data inputted from the camera 121 is explained in detail with reference to FIGS. 5 to 11.

In the following description, a process for searching and displaying the picture data, to which the voice name is tagged by the process shown in FIGS. 5 to 11, is explained in detail with reference to FIG. 12 and FIG. 13.

Figure 12:
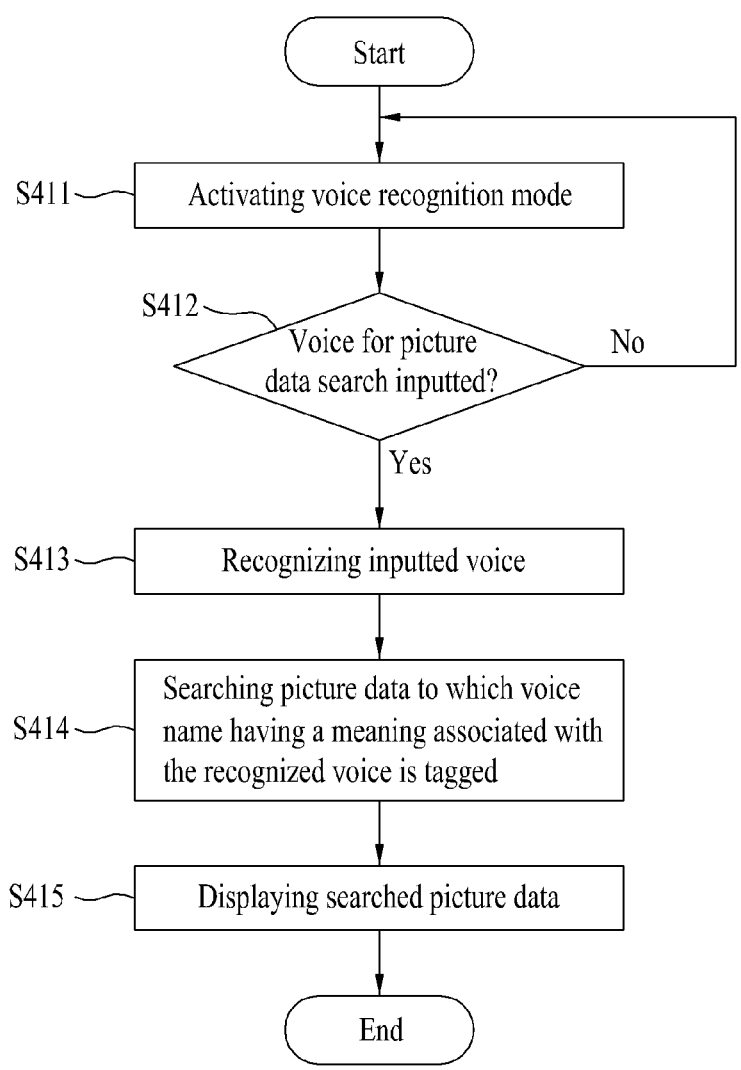
FIG. 12 is a flowchart of a process for searching and displaying a voice name tagged video data according to a first embodiment of the present invention.

FIG. 12 is a flowchart of a process for searching and displaying a voice name tagged video data according to a first embodiment of the present invention.

Figure 13:
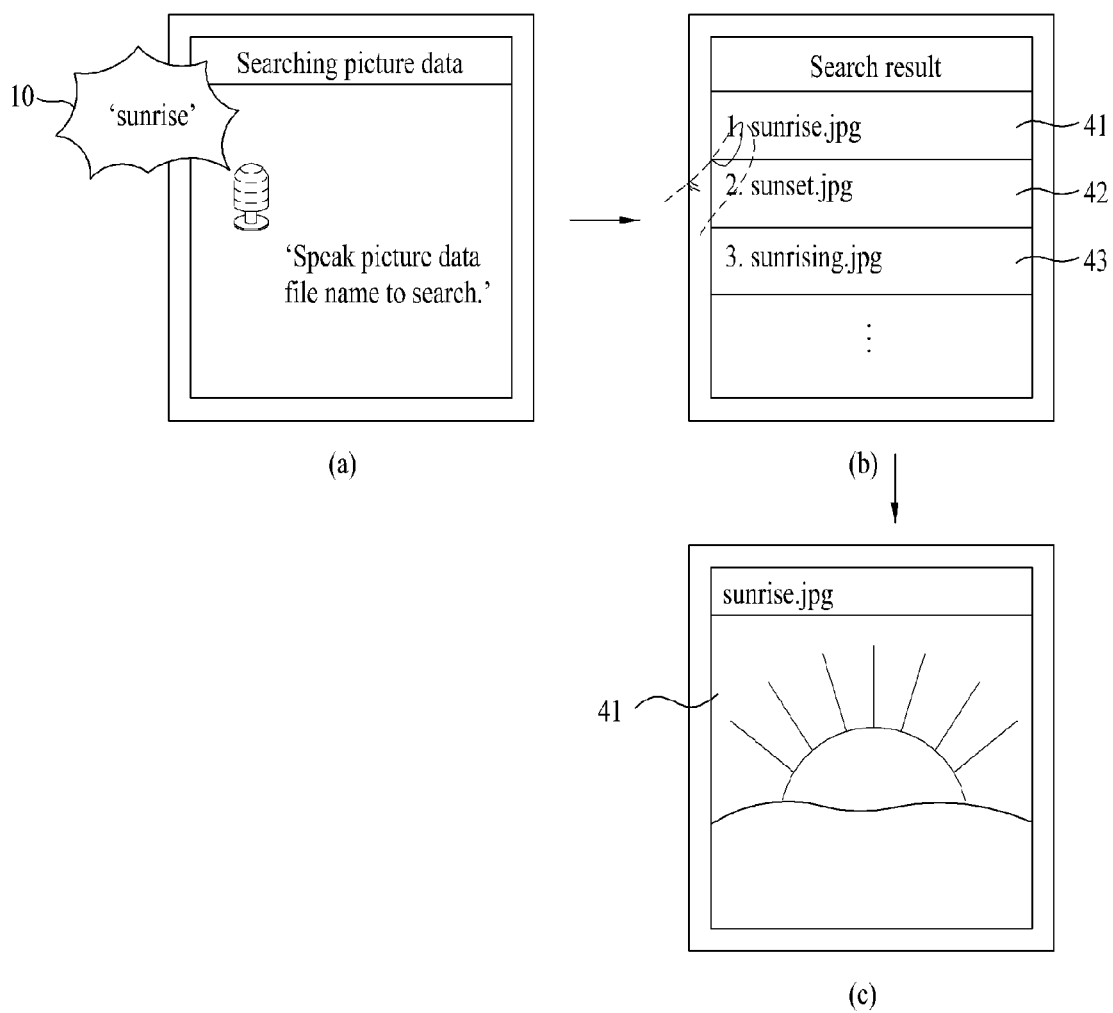
FIG. 13 is a diagram for screen configuration of a process for searching and displaying a voice name tagged video data according to a first embodiment of the present invention.

FIG. 13 is a diagram for screen configuration of a process for searching and displaying a voice name tagged video data according to a first embodiment of the present invention.

Referring to FIG. 12 and FIG. 13, while the picture data 20, to which the voice name is tagged by the process shown in FIGS. 3 to 11 is tagged, is stored in the memory 160, if a command signal for a search for the voice name tagged picture data is inputted via the user input unit 130 or the touchscreen 151, the controller 180 activates a voice recognition mode and activates the microphone 122 and the voice recognizing module 182 [S411].

Referring to FIG. 13 (*a*), if a voice 'sunrise' 10 for the search for the picture data 20 is inputted via the microphone 122 [S412], the controller recognizes the inputted voice 'sunrise' 10 via the voice recognizing module 182 [S413].

Subsequently, referring to FIG. 13 (*b*), the controller 180 searches the memory 160 for picture data 41 to 43, to which voice names having the meanings associated with the recognized voice 'sunrise' 10 are tagged, respectively, using the thesaurus database [S414] and then displays a list of the searched picture data 41 to 43 on the screen of the display unit 151 [S415].

Figure 15:
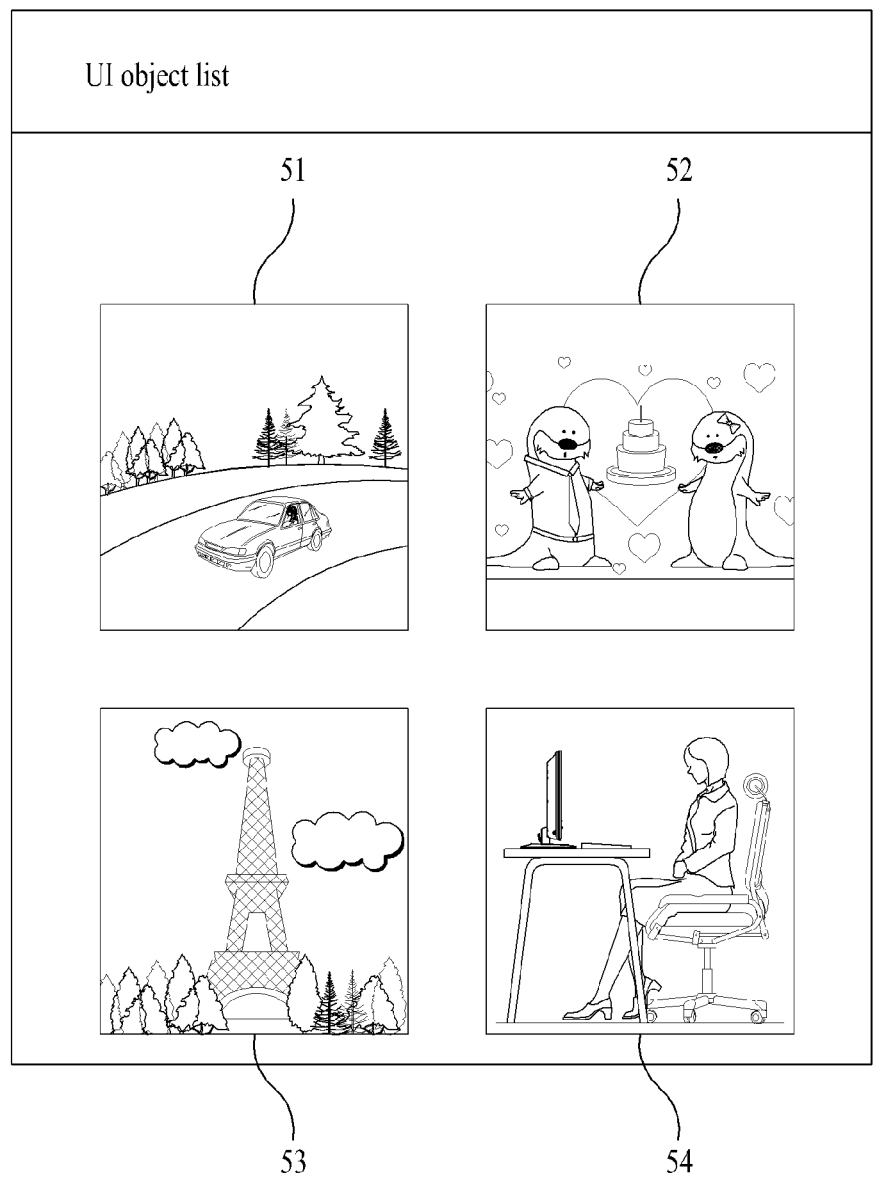
FIG. 15 is a diagram for screen configuration of a plurality of objects according to a third embodiment of the present invention.

In doing so, the controller 180 is able to display the picture data 41 to 43 shown in FIG. 15 (*b*) in a manner of discriminating the picture data 41 to 43 from each other according to one of priority, frequency of use and significance.

Moreover, the controller 180 searches the words having the meanings associated with the recognized voice 'sunrise' 10 using the thesaurus database. The controller 180 searches the memory 160 for the video data 41 to 43, to which voice names matching the meanings of the searched words are tagged, respectively, and then displays the searched video data 41 to 43.

In this case, referring to FIG. 13 (*b*), a specific picture data 41 is selected from the displayed picture data 41 to 43 is selected. If so, referring to FIG. 13 (*c*), the controller 180 displays the selected picture data 41 on the screen.

In the above description, the processes for searching the voice name tagged contents using the user's voice recognition according to the first and second embodiments of the present invention are explained in detail with reference to FIGS. 3 to 13.

In the following description, a process for tagging a voice name having a user-specific meaning to such a UI (user interface) object as an icon and a process for searching and sorting various kinds of contents provided to the mobile terminal using the voice name tagged UI object are explained in detail.

<Third Embodiment>

First of all, a process for tagging a voice name to a UI (user interface) object is explained in detail with reference to FIGS. 14 to 19 as follows.

Figure 14:
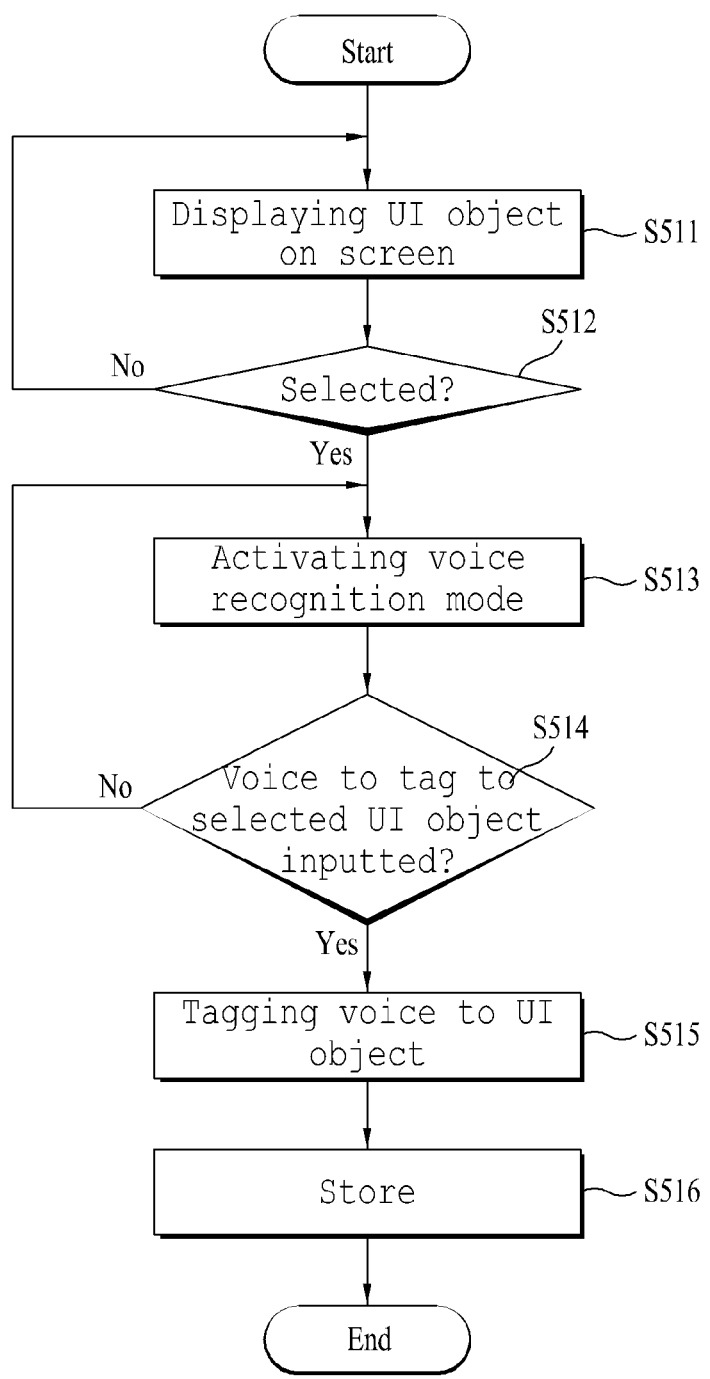
FIG. 14 is a flowchart of a process for tagging a voice name to a UI object according to a third embodiment of the present invention.

FIG. 14 is a flowchart of a process for tagging a voice name to a UI object according to a third embodiment of the present invention.

FIG. 15 is a diagram for screen configuration of a plurality of objects according to a third embodiment of the present invention.

FIGS. 16 to 19 are diagrams for screen configurations of a process for tagging a voice name to a UI object according to a third embodiment of the present invention.

Referring to FIG. 14 and FIG. 15, the controller 180 of the mobile terminal 180 displays a plurality of UI objects 51 to 54 on the screen of the display unit 151 [S511] [FIG. 6].

In this case, the UI object can be represented as an icon generated from combining 2D or 3D characters and/or images, an animation, an emoticon or the like. The UI object is initially provided to the memory 160 or can be obtained from outside via the wireless communication unit 110. The UI object can be displayed using an image captured by the camera 121.

Moreover, a displayed size of the UI object can be adjusted by a user. And, the UI object can be shifted on the screen of the display unit 151.

While the UI objects 51 to 54 are displayed on the screen of the display unit 151, if at least one UI object is selected via the user input unit 130 or the display unit 151 of a touchscreen type [S512], the controller 180 activates a voice recognition mode for tagging a voice name to the selected UI object and also activates the microphone 122 for receiving an input of at least one user's voice, which will be used as the voice name, and the voice recognizing module 182 [S513].

If the user's voice is inputted from the microphone 122, the controller 180 recognizes the inputted voice as a voice name of the selected UI object via the voice recognizing module 182, tags the recognized voice name to the selected UI object [S515], and then stores it in the memory 160 [S516].

Optionally, the controller 180 converts the voice name inputted from the microphone 122 to a text and is then able to tag the converted text to the selected UI object.

If the voice name is tagged to the UI object, the controller 180 is able to display an indicator indicating that the voice name is tagged to the UI object.

While the indicator is displayed on the UI object, if the indicator is selected, the controller 180 outputs the voice name tagged to the UI object to the audio output module 152. Alternatively, the controller 180 converts the voice name to a text and is then able to display the corresponding text.

In the following description, a process for tagging a voice name per type of each of the UI objects 51 to 54 is explained in detail with reference to FIGS. 16 to 19.

Figure 16:
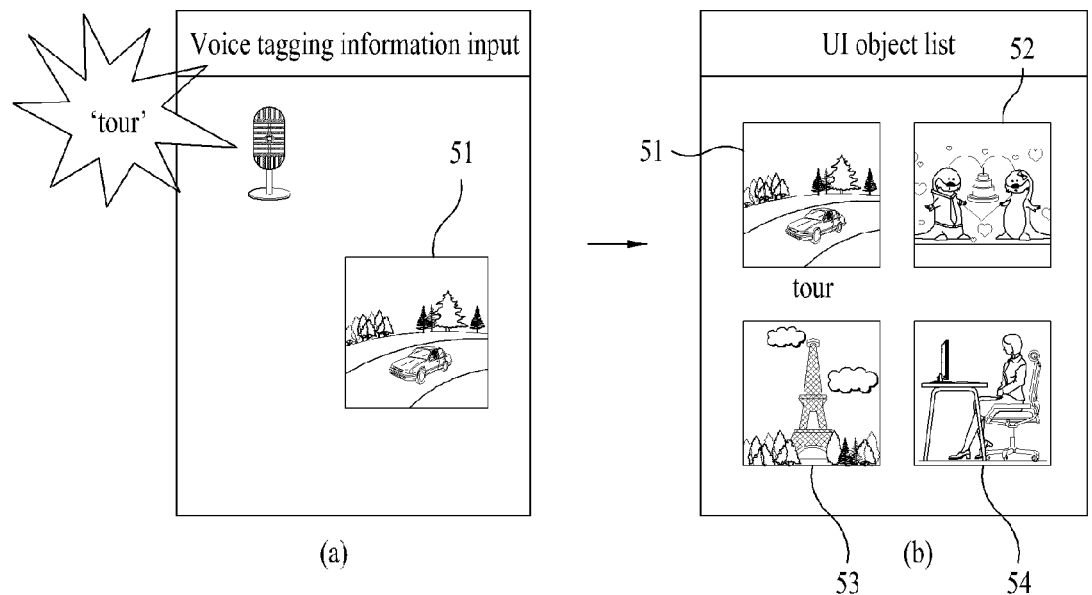
FIGS. 16 to 19 are diagrams for screen configurations of a process for tagging a voice name to a UI object according to a third embodiment of the present invention.

Referring to FIG. 16, if the first UI object 51 is selected from the UI objects 51 to 54 shown in FIG. 15, the controller 180 activates the microphone 122 and the voice recognizing module 182.

Subsequently, referring to FIG. 16 (*a*), if a voice 'tour' is inputted from the microphone 122, the controller 180 recognizes the voice 'tour' as a voice name of the first UI object 51. Referring to FIG. 16 (*b*), the controller 180 then tags the recognized voice name 'tour' to the first UI object 51.

Figure 17:
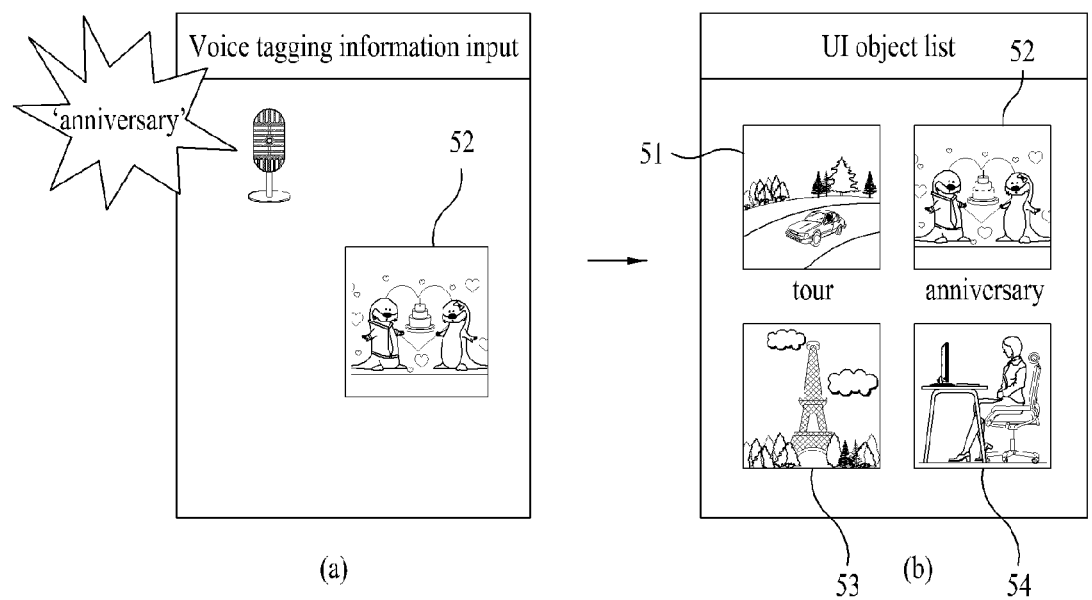

Referring to FIG. 17 (*a*), if the second UI object is selected from the UI objects 51 to 54 and a voice 'anniversary' is inputted from the microphone 122, the controller 180 recognizes the voice 'anniversary' as a voice name of the second UI object 52 via the voice recognizing module 182. Referring to FIG. 17 (*b*), the controller 180 then tags the recognized voice name 'anniversary' to the second UI object 52.

Figure 18:
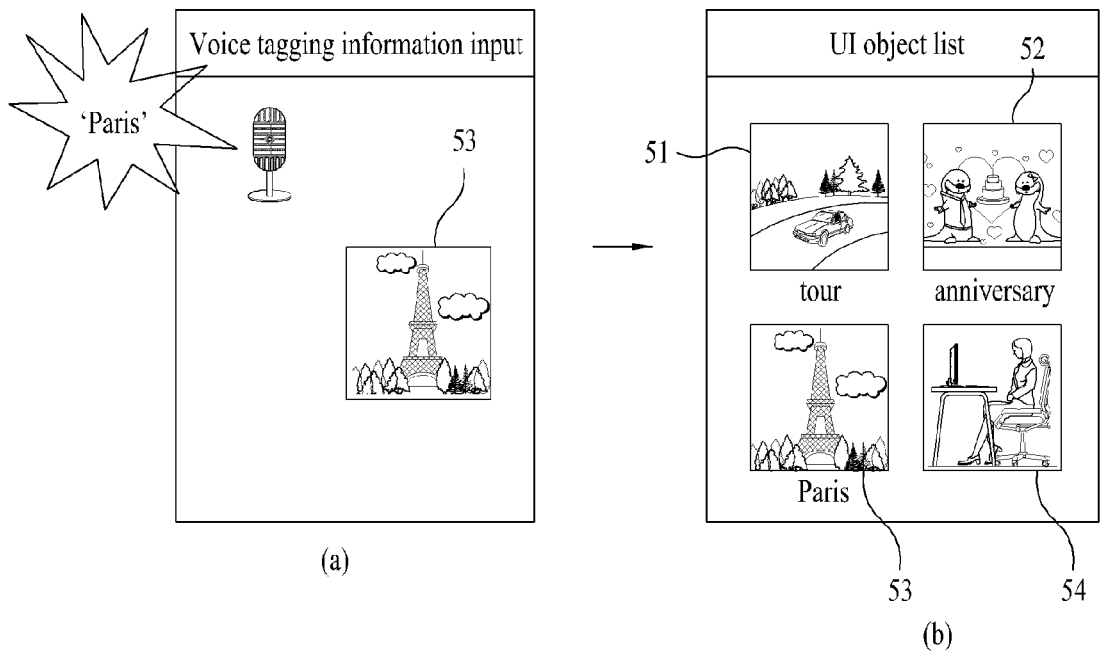

Referring to FIG. 18 (*a*), if the third UI object 53 is selected from the UI objects 51 to 54 and a voice 'Paris' is inputted from the microphone 122, the controller 180 recognizes the voice 'Paris' as a voice name of the third UI object 53 via the voice recognizing module 182. Referring to FIG. 18 (*b*), the controller 180 then tags the recognized voice name 'Paris' to the third UI object 53.

Figure 19:
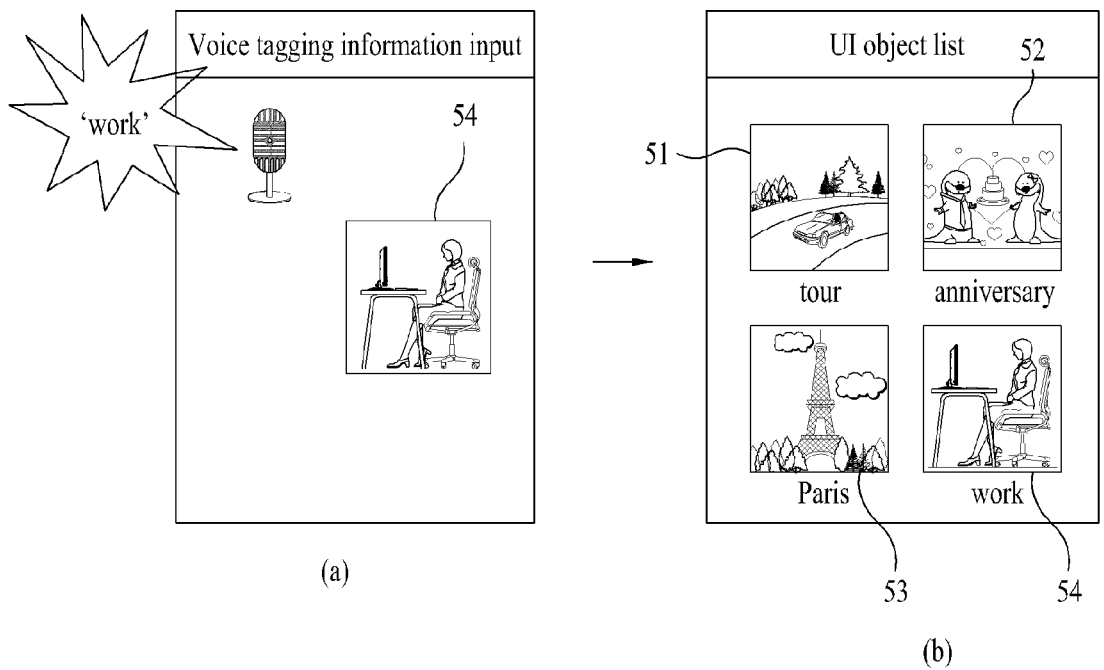

Referring to FIG. 19 (*a*), if the fourth UI object is selected from the UI objects 51 to 54 and a voice 'work' is inputted from the microphone 122, the controller 180 recognizes the voice 'work' as a voice name of the fourth UI object 54 via the voice recognizing module 182. Referring to FIG. 19 (*b*), the controller 180 then tags the recognized voice name 'work' to the fourth UI object 54.

So far, in the above description, the process for tagging the voice name to the UI object is explained in detail with reference to FIGS. 14 to 19.

In the following description, a process for tagging a voice name of a UI object to a content using the UI object which the voice name is tagged by the process shown in FIGS. 14 to 19 is explained in detail with reference to FIGS. 20 to 28.

Figure 20:
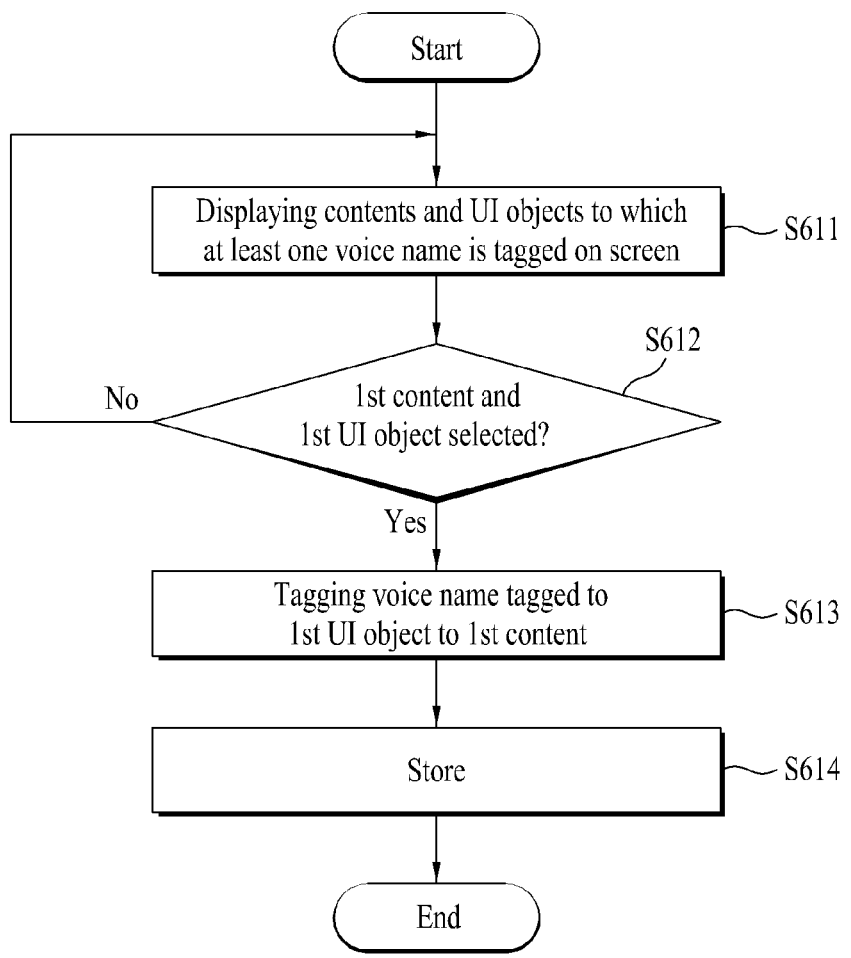
FIG. 20 is a diagram for a flowchart of a process for tagging a UI object tagged voice name to a content according to a third embodiment of the present invention.

FIG. 20 is a diagram for a flowchart of a process for tagging a UI object tagged voice name to a content according to a third embodiment of the present invention.

FIGS. 21 to 28 are diagrams for screen configurations of a process for tagging a UI object tagged voice name to a content according to a third embodiment of the present invention.

Referring to FIG. 20, the controller displays at least one content and a plurality of UI objects, to which the voice names are tagged by the aforesaid process shown in FIGS. 14 to 19, on the screen of the display unit 151 [S611].

In this case, the content of the present invention can include a document file, an image file, a received message, contact information within a phonebook, an audio file, a game file, a schedule file, a text file, an e-dictionary file, a calculator file, webpage address information, and the like. In particular, the content can include all data existing in the menu function of the mobile terminal 100 according to the present invention. And, the contact information can include a mobile phone number, name, home phone number, email address and the like of a correspondent party.

In this case, if a first content and a first UI object are selected by a user via the user input unit 130 of the display unit 151 of a touchscreen type [S612], the controller 180 tags a voice name tagged to the first UI object to the first content [S613] and then stores it in the memory 160 [S614].

In doing so, if the first UI object is dragged & dropped to the first content, the controller 180 is able to tag a voice name tagged to the first UI object to the first content. If the first UI object and the first content are multi-touched, the controller is able to tag a voice name tagged to the first UI object to the first content.

In the following description, a process for tagging a voice name tagged to a UI object to various kinds of contents of a mobile terminal according to the present invention is explained in detail with reference to FIGS. 21 to 28.

Figure 21:
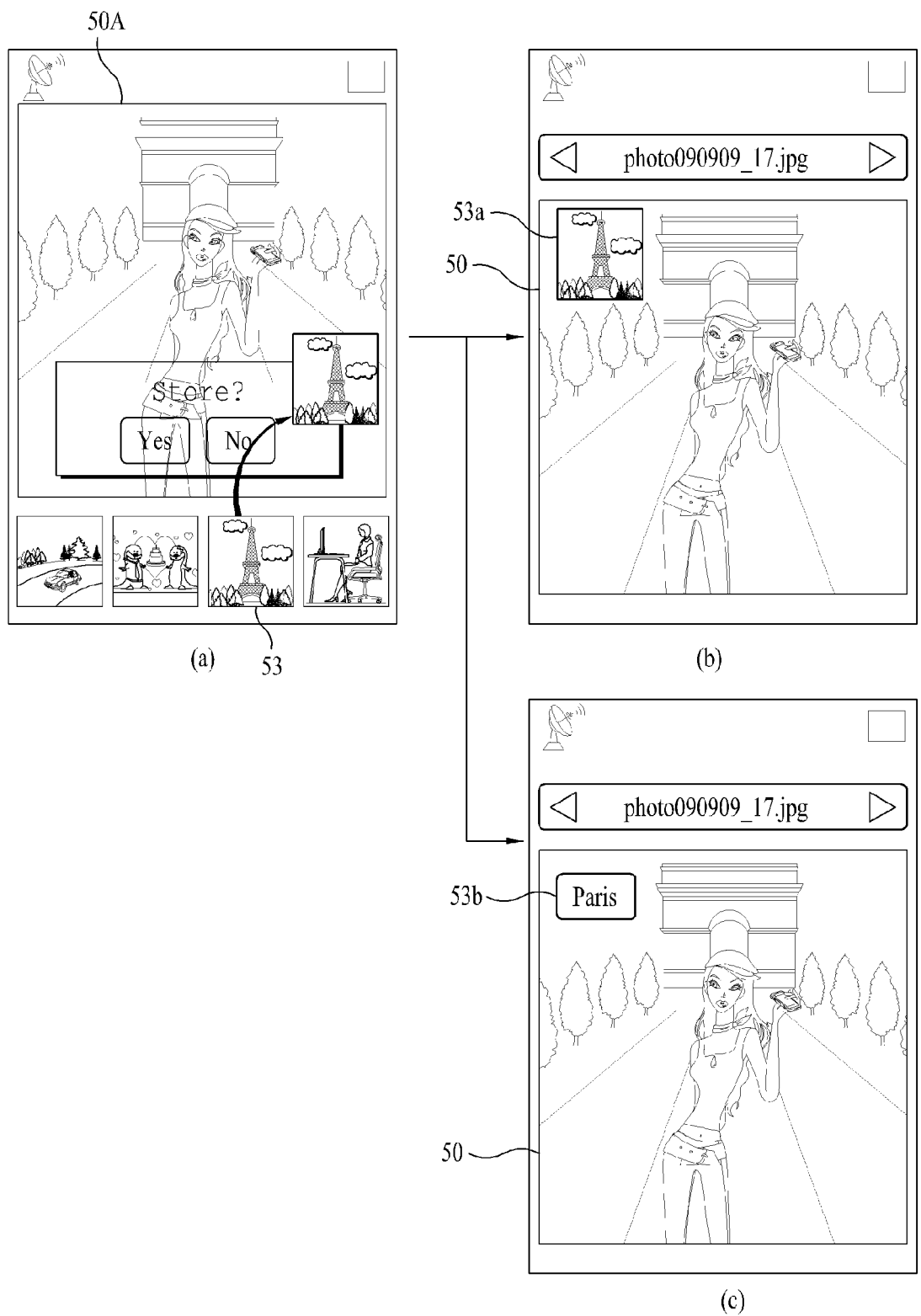

FIG. 21 shows that a photographed image content 50A and a plurality of UI objects having different voice names tagged thereto are displayed on a camera menu.

Referring to FIG. 21 (a), if the UI object 53, to which a voice name 'Paris' is tagged, among the UI objects is dragged & dropped to the photographed image contents 50A via the user input unit 130 or the touchscreen 151, the controller 180 tags the voice name 'Paris' tagged to the UI object 53 to the image content 50A and the stores it, as shown in FIG. 21 (b) and FIG. 21 (c).

In this case, if the voice name 'Paris' tagged UI object 53 and the photographed image content 50A are multi-touched, the controller 180 is able to tag the voice name 'Paris' tagged to the UI object 53 to the image content 50A [not shown in FIG. 21].

If the voice name 'Paris' tagged UI object 53 is long touched or double touched, the controller 180 is able to tag the voice name 'Paris' tagged to the UI object 53 to the image content 50A on a current screen [not shown in FIG. 21].

Meanwhile, referring to FIG. 21 (b), the controller 180 is able to display an icon type indicator 53a indicating that the voice name 'Paris' is tagged to the image content 50A. The indicator 53a can be displayed at the point where the UI object 53 is dragged & dropped to the image content 50A.

If the indicator 53a within the image content 50A is selected, the controller 180 is able to output the voice name 'Paris' tagged to the image content 50A to the audio output module 152.

Referring to FIG. 21 (c), if the indicator 53a within the image content 50A is selected, the controller 180 converts the voice name 'Paris' tagged to the image content 50A to a text and is then able to display the converted text type indicator 53b within the image content 50A.

Figure 22:
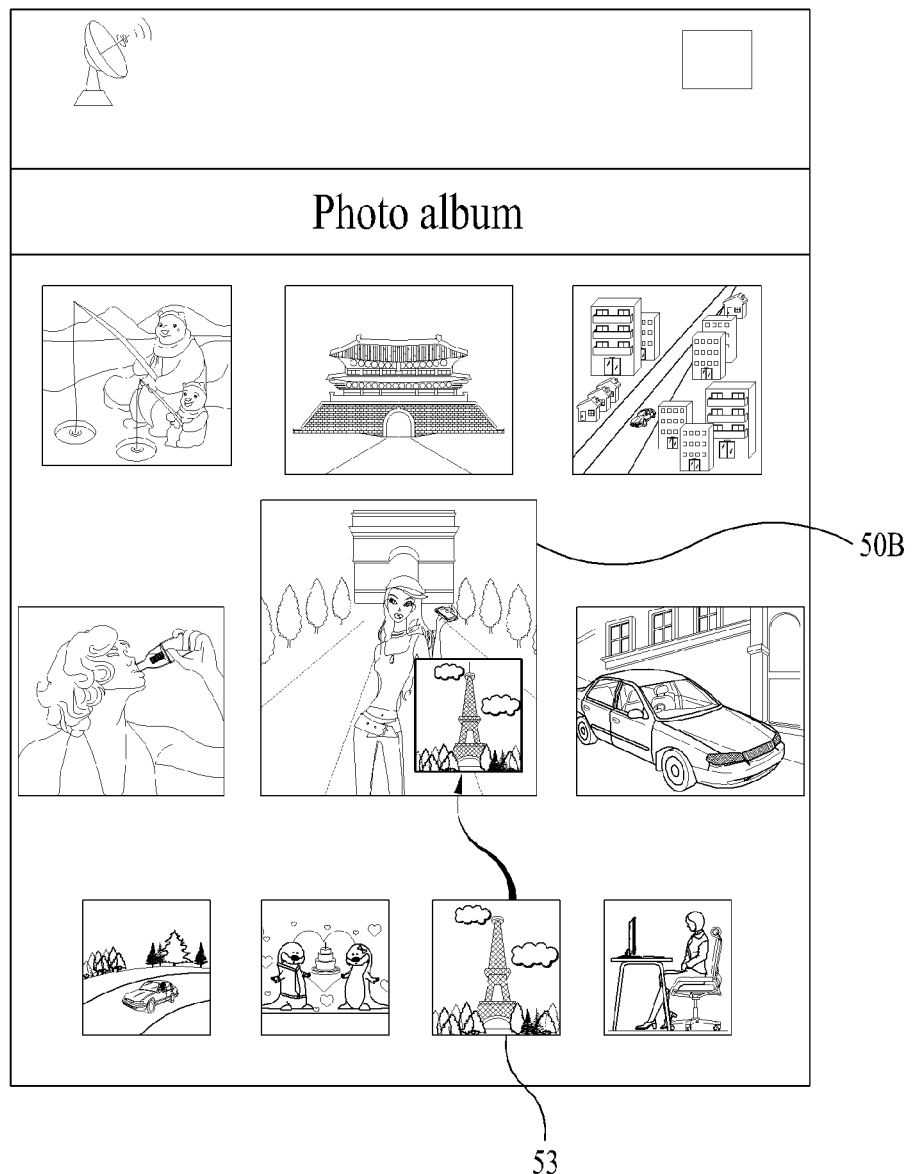

FIG. 22 shows that a plurality of image contents stored in a photo album menu and a plurality of UI objects having different voice names tagged thereto are displayed.

Referring to FIG. 22, if the UI object 53, to which the voice name 'Paris' is tagged among the UI objects, is dragged & dropped to a specific image 50B through the user input unit 130 or the touchscreen 151, the controller 180 tags the voice name 'Paris' tagged to the UI object 53 to the specific image 50B and then stores it.

FIG. 23 (a) shows that a music file list and a plurality of UI objects having different voice names tagged thereto are displayed.

Referring to FIG. 23 (a), if the UI object 53, to which the voice name 'Paris' is tagged among the UI objects, is dragged & dropped to a music file 'Pinocchio.mps' 60A through the user input unit 130 or the touchscreen 151, the controller 180 tags the voice name 'Paris' tagged to the UI object 53 to the music file 'Pinocchio.mps' 60A and then stores it.

FIG. 23 (b) shows that a plurality of UI objects having different voice names tagged thereto are displayed on a music file play picture 60B.

Referring to FIG. 23 (b), if the UI object 53, to which the voice name 'Paris' is tagged among the UI objects, is dragged & dropped to a music file play picture 'Comment te dire adieu.mp3' 60B through the user input unit 130 or the touchscreen 151, the controller 180 tags the voice name 'Paris' tagged to the UI object 53 to the music file play picture 'Comment te dire adieu.mp3' 60B and then stores it.

Figure 24:
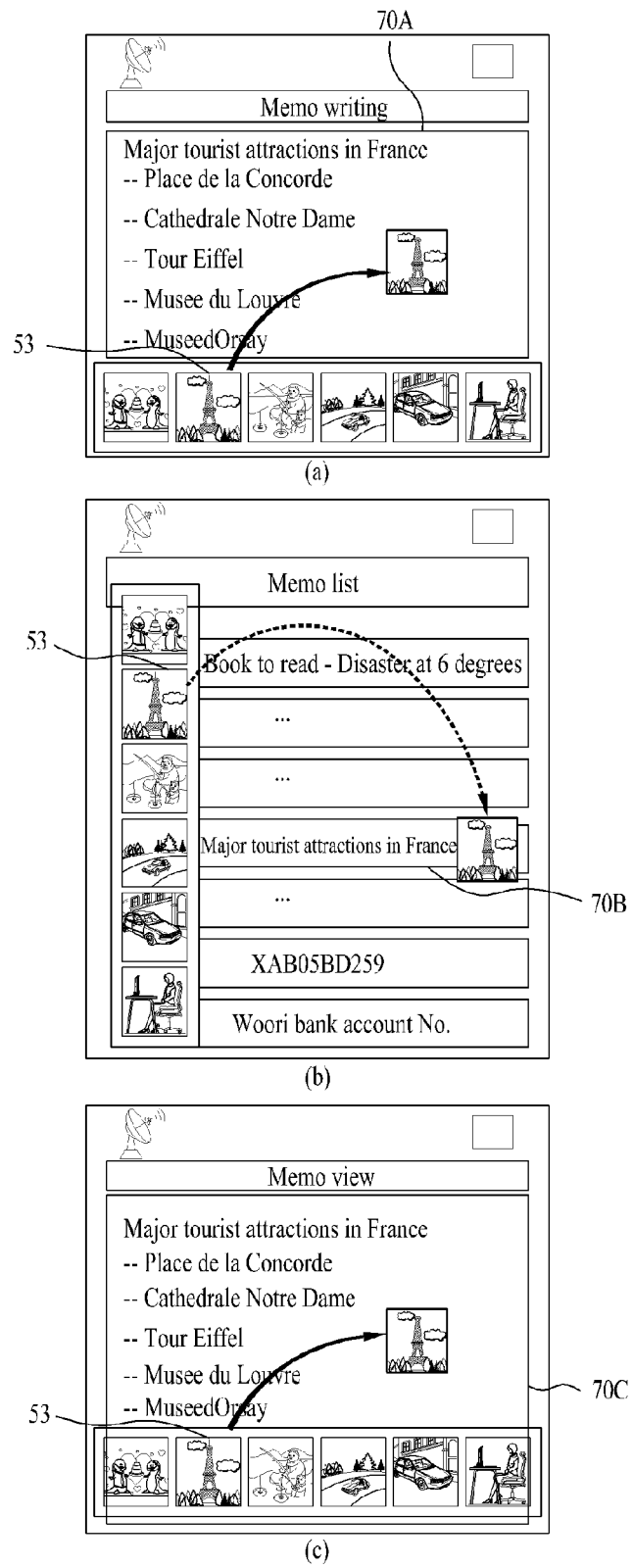

FIG. 24 (a) shows that a plurality of UI objects having different voice names tagged thereto are displayed in a memo writing picture 70A.

Referring to FIG. 24 (a), if the UI object 53, to which the voice name 'Paris' is tagged among the UI objects, is dragged & dropped to a current memo writing picture 70A through the user input unit 130 or the touchscreen 151, the controller 180 tags the voice name 'Paris' tagged to the UI object 53 to the current memo writing picture 70A and then stores it.

FIG. 24 (b) shows that a plurality of UI objects having different voice names tagged thereto are displayed in a memo list picture.

Referring to FIG. 24 (b), if the UI object 53, to which the voice name 'Paris' is tagged among the UI objects, is dragged & dropped to a memo 'Major tourist attractions' 70B through the user input unit 130 or the touchscreen 151, the controller 180 tags the voice name 'Paris' tagged to the UI object 53 to the memo 'Major tourist attractions' 70B and then stores it.

FIG. 24 (c) shows that a plurality of UI objects having different voice names tagged thereto are displayed in a memo view picture 70C.

Referring to FIG. 24 (c), if the UI object 53, to which the voice name 'Paris' is tagged among the UI objects, is dragged & dropped to a currently viewed memo view picture 70C through the user input unit 130 or the touchscreen 151, the controller 180 tags the voice name 'Paris' tagged to the UI object 53 to the currently viewed memo 70C and then stores it.

Figure 25:
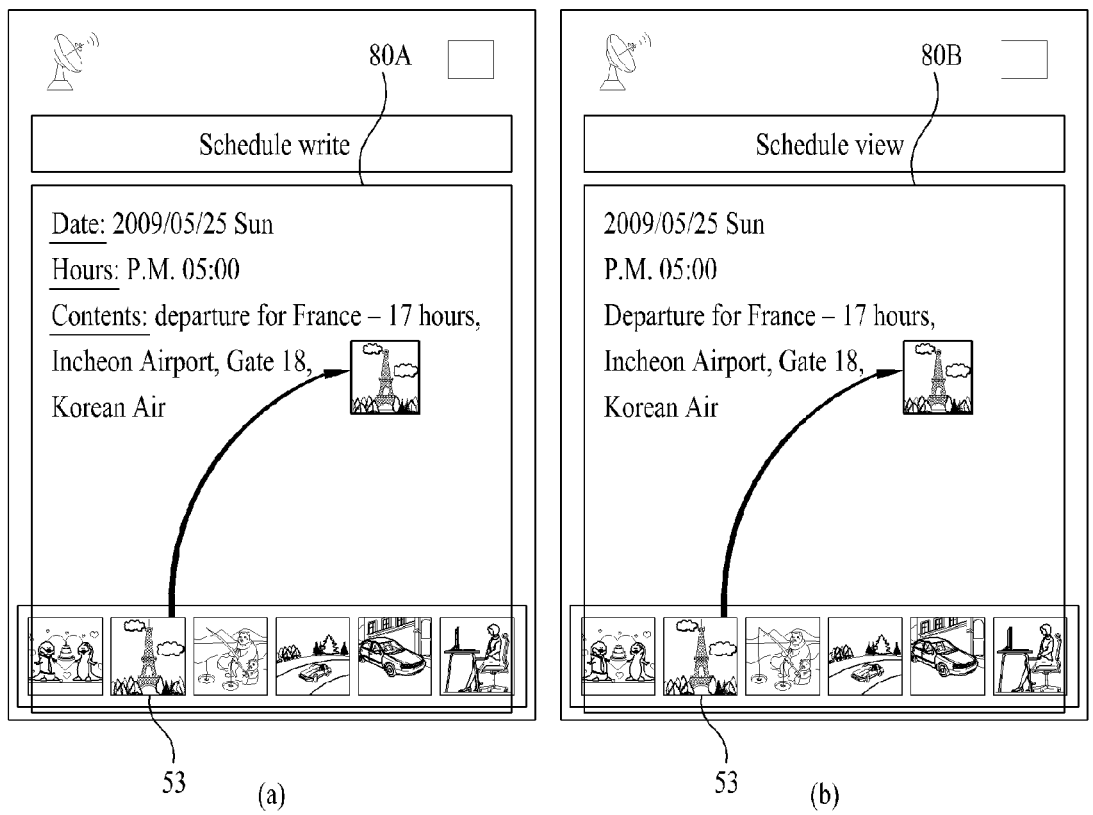

FIG. 25 (a) shows that a plurality of UI objects having different voice names tagged thereto are displayed in a schedule writing picture 80A.

Referring to FIG. 25 (a), if the UI object 53, to which the voice name 'Paris' is tagged among the UI objects, is dragged & dropped to a currently written schedule picture 80A through the user input unit 130 or the touchscreen 151, the controller 180 tags the voice name 'Paris' tagged to the UI object 53 to the currently written schedule 80A and then stores it.

FIG. 25 (b) shows that a plurality of UI objects having different voice names tagged thereto are displayed in a schedule view picture 80B.

Referring to FIG. 25 (b), if the UI object 53, to which the voice name 'Paris' is tagged among the UI objects, is dragged & dropped to a currently viewed schedule picture 80B through the user input unit 130 or the touchscreen 151, the controller 180 tags the voice name 'Paris' tagged to the UI object 53 to the currently viewed schedule 80B and then stores it.

Figure 26:
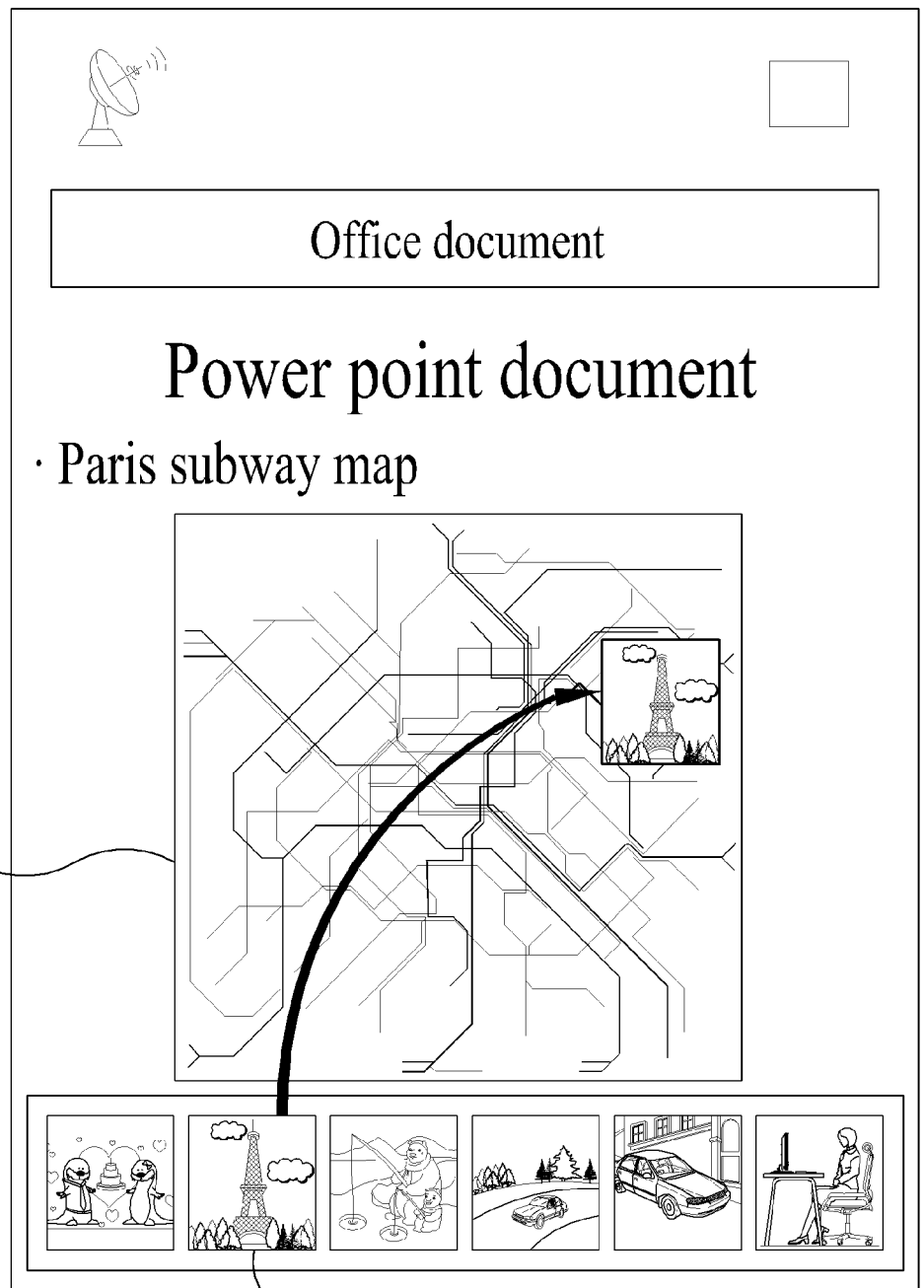

FIG. 26 shows that a plurality of UI objects having different voice names tagged thereto are displayed in a document file execute picture 90.

Referring to FIG. 26, if the UI object 53, to which the voice name 'Paris' is tagged among the UI objects, is dragged & dropped to a currently executed document file picture 90 through the user input unit 130 or the touchscreen 151, the controller 180 tags the voice name 'Paris' tagged to the UI object 53 to the currently executed document file 90 and then stores it.

Figure 27:
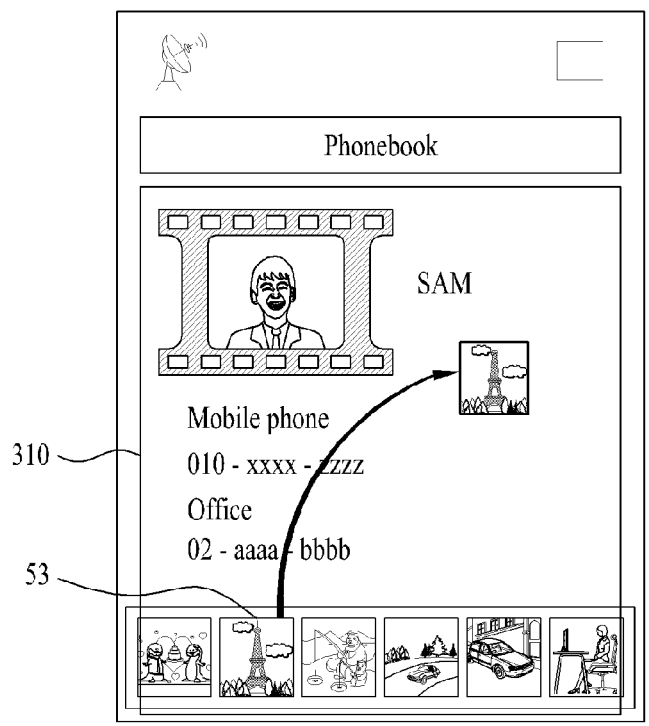

FIG. 27 shows that a plurality of UI objects having different voice names tagged thereto are displayed in a phonebook contact information view picture 310.

Referring to FIG. 26, if the UI object 53, to which the voice name 'Paris' is tagged among the UI objects, is dragged & dropped to a currently viewed contact information picture 310 through the user input unit 130 or the touchscreen 151, the controller 180 tags the voice name 'Paris' tagged to the UI object 53 to the currently viewed contact information 310 and then stores it.

Figure 28:
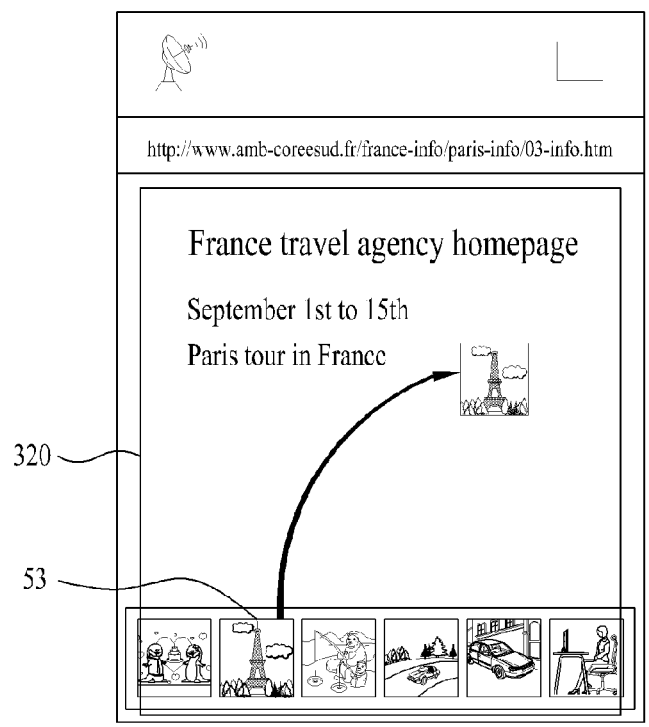

FIG. 28 shows that a plurality of UI objects having different voice names tagged thereto are displayed in a webpage access picture 320.

Referring to FIG. 28, if the UI object 53, to which the voice name 'Paris' is tagged among the UI objects, is dragged & dropped to a currently accessed webpage picture 320 through the user input unit 130 or the touchscreen 151, the controller 180 tags the voice name 'Paris' tagged to the UI object 53 to the currently accessed webpage information 320 and then stores it.

Besides, if at least one or more UI objects are dragged & dropped to the content, the controller 180 is able to tag the voice names tagged to the UI objects to the content as well [not shown in the drawings].

In the above description, the process for tagging the voice name of the UI object to the content using the voice name tagged UI object is explained in detail with reference to FIGS. 20 to 28.

In the following description, a process for searching and displaying the content, to which the voice name is tagged by the process shown in FIGS. 20 to 28, using a voice name tagged UI object is explained in detail with reference to FIGS. 29 to 30.

Figure 29:
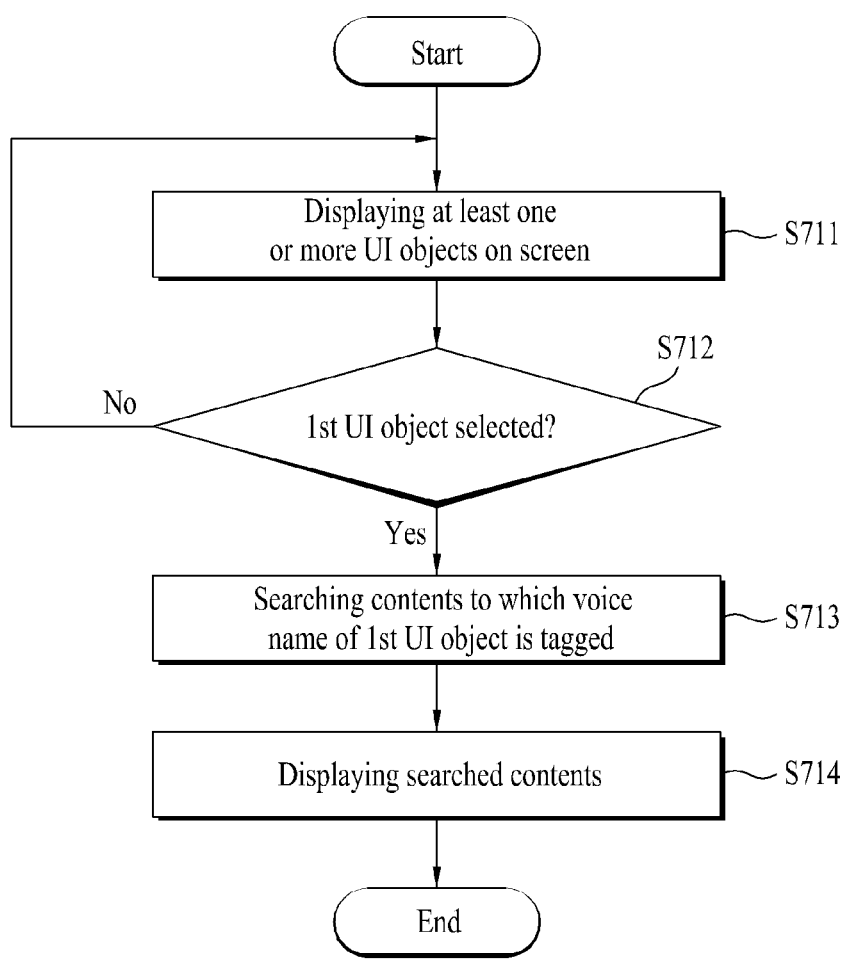
FIG. 29 is a flowchart of a process for searching and displaying a voice name tagged content using a UI object according to a third embodiment of the present invention.

FIG. 29 is a flowchart of a process for searching and displaying a voice name tagged content using a UI object according to a third embodiment of the present invention.

FIG. 30 is a diagram for screen configuration of a process for searching and displaying a voice name tagged content using a UI object according to a third embodiment of the present invention.

Referring to FIG. 29 and FIG. 30, the UI objects, to which different voice names are tagged by the processes shown in FIGS. 4 to 19, respectively, are displayed [S711] [FIG. 30 (a)].

In doing so, the UI objects can be displayed in a manner of being aligned in formation of list, grid or rotation.

If the UI object 53, to which the voice name 'Paris' is tagged, is selected from the UI objects [S712], the controller 180 searches the contents stored in the memory 160 for the contents 400 to which the voice name 'Paris' of the UI object 53 is tagged [S713]. The controller 180 then displays the searched contents 400 on the displayed unit 151 [S714] [FIG. 30 (b)].

For instance, while the voice name 'Paris' is tagged to an image content 'paris.jpg' and a music content 'Sans Toi Mamie.mps' within the memory 160, if the voice name 'Paris' tagged UI object 53 is selected, the controller 180 searches and displays the image content 'paris.jpg' and the music content 'Sans Toi Mamie.mp3', to which the same voice name of the voice name 'Paris' tagged to the UI object 53 is tagged.

If the voice name 'Paris' tagged UI object 53 is selected [S712], the controller 180 searches words associated with the voice name 'Paris' using the thesaurus database provided within the memory 160. The controller 180 searches the memory 160 for the contents, to which the voice name having the searched words is tagged, and then displays the searched contents.

Meanwhile, in case that the number of the contents searched in the step S713 is plural, the controller 180 obtains categories of the contents. The controller 180 is then able to sort and display the contents according to the obtained categories.

Moreover, referring to FIG. 30 (b), the controller 180 renders the sorted contents into a list and is then able to display the list at the position of the UI object 53.

If a specific content is selected from the list displayed at the position of the UI object 53, the controller 180 executes a function of the selected content.

In the above description, a process for searching and displaying a voice name tagged content using a voice name tagged UI object is explained in detail with reference to FIGS. 29 to 30.

In the following description, a process for searching and displaying a content, to which the voice name of the UI object is tagged, using a user's voice search word is explained in detail with reference to FIG. 31 and FIG. 32.

Figure 31:
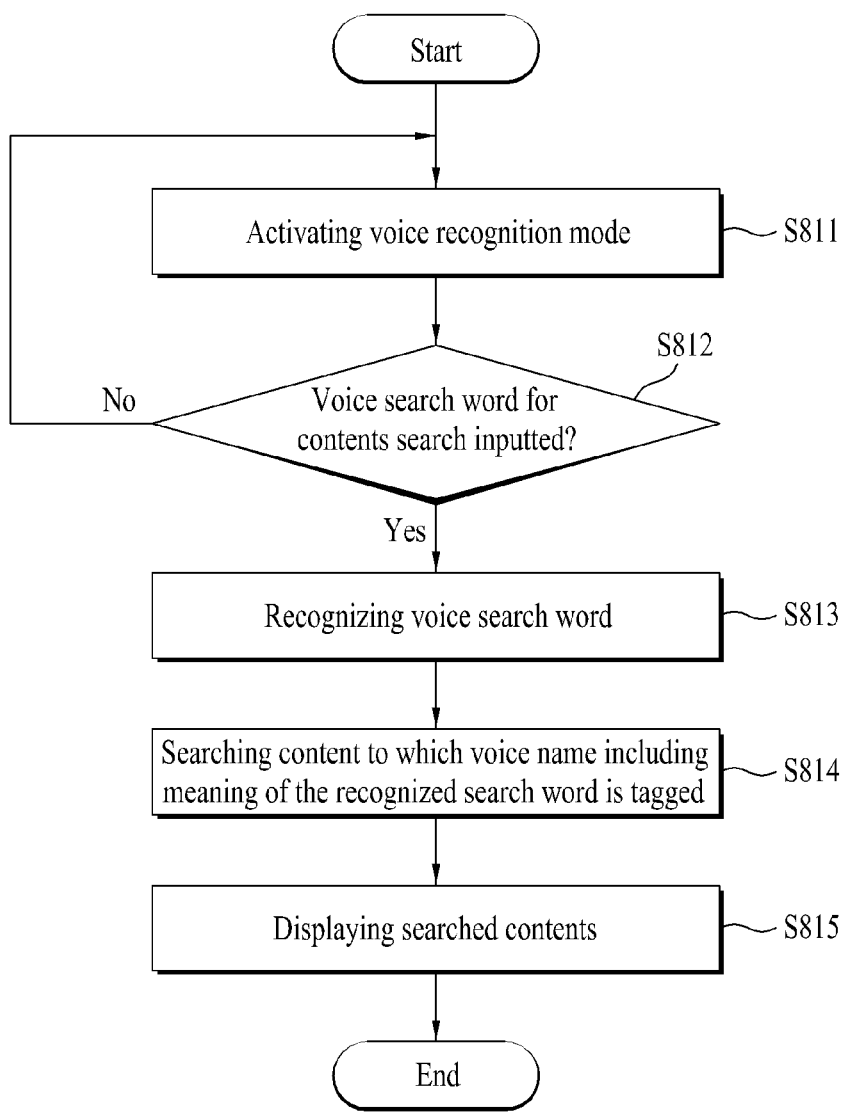
FIG. 31 is a flowchart of a process for searching and displaying a voice name tagged content using a voice search word according to a third embodiment of the present invention.

FIG. 31 is a flowchart of a process for searching and displaying a voice name tagged content using a voice search word according to a third embodiment of the present invention.

Figure 32:
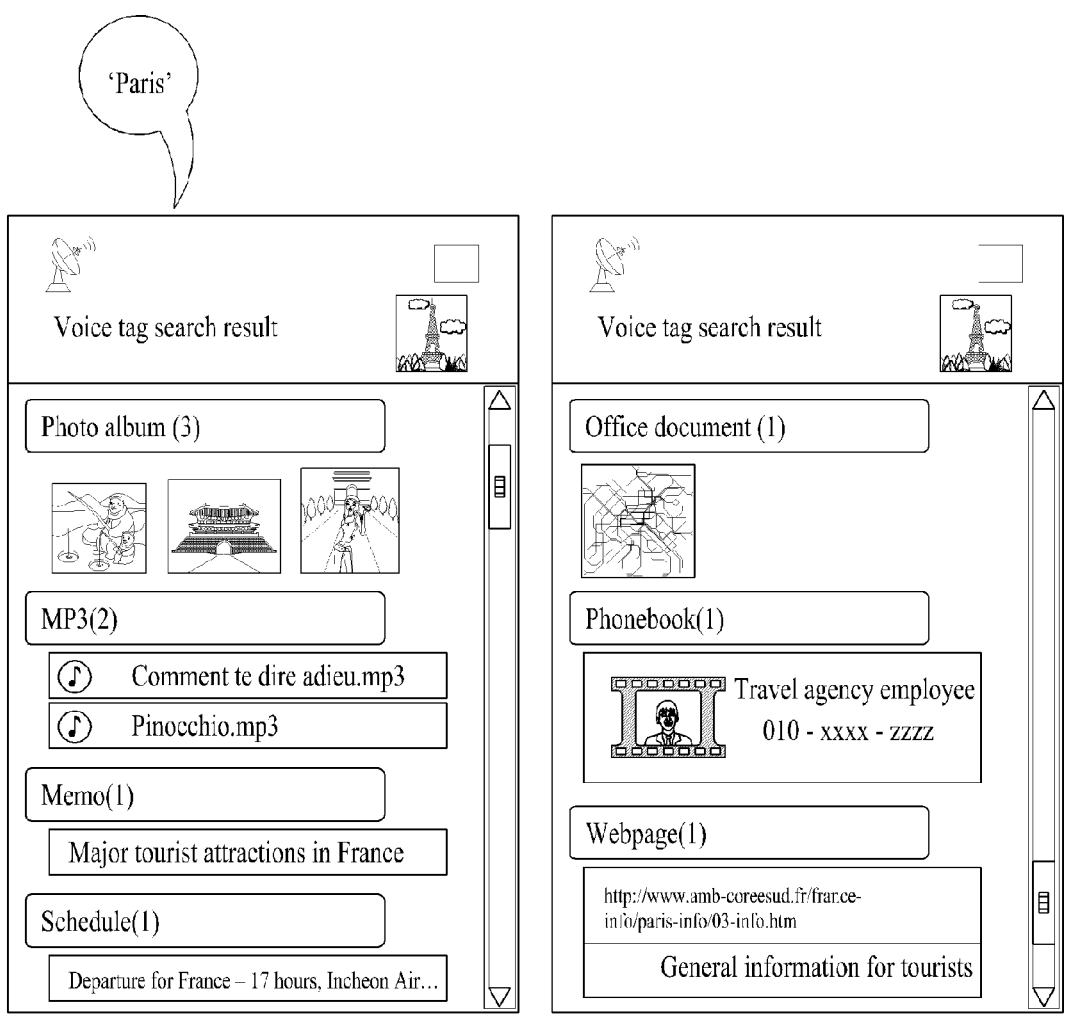
FIG. 32 is a diagram for screen configuration of a process for searching and displaying a voice name tagged content using a voice search word according to a third embodiment of the present invention.

FIG. 32 is a diagram for screen configuration of a process for searching and displaying a voice name tagged content using a voice search word according to a third embodiment of the present invention.

Referring to FIG. 31 and FIG. 32, the controller 180 activates a voice recognition mode for a search of the contents stored in the mobile terminal 100 using a user's voice as a search word and then activates the microphone 122 and the voice recognizing module 182 for the recognition of the user's voice inputted from the microphone 122 [S811].

If the user's voice for the content search is inputted from the microphone 122 [S812], the controller 180 recognizes the inputted voice by controlling the voice recognizing module 182 [S813], searches the memory 160 for contents to which the voice name matching the recognized voice is tagged [S814], and then displays the searched contents on the screen of the display unit 151 [S815].

In doing so, the controller 180 searches the memory 160 for the contents to which the same voice name of the recognized voice is tagged. Alternatively, the controller 180 is able to search the memory 160 for the contents to which the voice name including the recognized voice is tagged.

Moreover, the controller 180 searches words associated with the recognized voice using the thesaurus database and is then able to search the memory 160 for the contents to which the voice name having the searched words is tagged.

Meanwhile, referring to FIG. 32, if a search word of a voice 'Paris' is inputted by a user via the microphone 122, the controller 180 recognizes the voice 'Paris' via the voice recognizing module 182, searches the contents stored in the memory for the contents to which the voice name including the voice 'Paris' is tagged, and then displays the searched contents on the screen.

In doing so, in case that the number of the searched contents is plural, the controller 180 obtains categories of the contents. The controller 180 is then able to sort and display the contents according to the obtained categories, as shown in FIG. 32.

Accordingly, the present invention provides the following effects and/or advantages.

First of all, according to a the present invention, in searching picture data stored in a mobile terminal using voice recognition, the present invention searches specific picture data and other picture data associated with the specific picture data, thereby providing a user with various data search functions.

Secondly, the present invention provides a function of searching and sorting contents provided to a mobile terminal with ease using voice tagged UI objects.

It will be apparent to those skilled in the art that various modifications and variations can be specified into other forms without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
 a display unit configured to display at least one content and at least one UI (User Interface) object having at least one voice name tagged thereto;
 a microphone;
 a memory; and
 a controller configured to:
 when the at least one content and the at least one UI object are selected, tag the voice name tagged to the selected UI object to the selected content;
 store the voice name tagged content in the memory;
 analyze a voice for a specific content search is inputted via the microphones;
 search the memory for at least one content to which a voice name having a meaning associated with the analyzed voice is tagged; and
 control the display unit to display the searched at least one content.

2. The mobile terminal of claim 1, wherein the content includes an image inputted from a camera of the mobile terminal and wherein when the image is inputted via the camera, if a voice name of the image is inputted to the microphone, the controller tags the inputted voice name to the image and then stores the voice name tagged image in the memory.

3. The mobile terminal of claim 2, wherein when the image is inputted via the camera, if a half shutter key is inputted, the controller activates the microphone and wherein if the voice name of the image is inputted via the microphone, the controller tags the inputted voice name to the image and then stores the voice name tagged image in the memory.

4. The mobile terminal of claim 2, wherein when the image is inputted via the camera, the controller activates the microphone and wherein if the voice name having a preset sound pressure is inputted via the microphone, the controller tags the inputted voice name to the image and then stores the voice name tagged image in the memory.

5. The mobile terminal of claim 2, wherein the image further includes a voice memo.

6. The mobile terminal of claim 5, wherein the image within the memory further includes a text memo generated from converting the voice memo to a text.

7. The mobile terminal of claim 2, wherein the memory further includes a thesaurus database and wherein the controller searches the thesaurus database for at least one word having the meaning associated with the voice name inputted via the microphone, tags the searched at least one word to the image and then stores the searched word tagged image in the memory.

8. The mobile terminal of claim 7, wherein the controller tags the voice name corresponding to the searched word to the image.

9. The mobile terminal of claim 7, wherein when a voice for an image search is inputted to the microphone, the controller searches the memory for at least one image to which a word having the meaning associated with the inputted voice is tagged and then displays the searched image.

10. The mobile terminal of claim 7, wherein the controller writes the searched at least one word in attribute information of the image.

11. The mobile terminal of claim 10, wherein when at least one word is selected from the attribute information, the controller searches the image having the selected word tagged thereto and then displays the searched image.

12. The mobile terminal of claim 1, wherein a text corresponding to the voice name is further tagged to the UI object.

13. The mobile terminal of claim 1, wherein the memory further includes a thesaurus database and wherein the controller searches the thesaurus database for at least one word having the meaning associated with the voice name tagged to the selected UI object, tags the searched at least one word to the content and then stores the searched word tagged content in the memory.

14. The mobile terminal of claim 1, wherein when the at least one UI object is dragged and dropped to the at least one content, the controller tags the voice name tagged to the at least one UI object to the at least one content.

15. The mobile terminal of claim 14, wherein the controller displays information indicating that the voice name of the at least one UI object is tagged to the at least one content at a position where the at least one UI object is dragged and dropped within the at least one content.

16. The mobile terminal of claim 1, wherein when a voice for a content search is inputted to the microphone, the controller searches the memory for a content to which a voice name having a meaning associated with the inputted voice is tagged and then displays the searched content.

17. The mobile terminal of claim 1, wherein when the voice name of the at least one UI object is tagged to the at least one content, if the at least one UI object is selected, the controller searches and displays at least one content to which the voice name of the at least one UI object is tagged.

18. The mobile terminal of claim 1, wherein the memory further includes a thesaurus database and wherein the controller searches the thesaurus database for at least one word having the meaning associated with the voice inputted via the microphone, searches the memory for at least one content having the searched word tagged thereto and then displays the searched at least one content on the display unit.

19. The mobile terminal of claim 1, wherein if the number of the searched at least one content is plural, the searched at least one or more contents are displayed by the controller in a manner of being discriminated from each other according to one selected from the group consisting of a preset priority, a frequency of use and a significance.

20. The mobile terminal of claim 1, wherein if the number of the searched at least one content is plural, the controller obtains categories of the searched contents and sorts and displays the searched contents according to the obtained categories, respectively.

21. A method of controlling a mobile terminal, the method comprising:

displaying at least one content and at least one UI (User Interface) object having at least one voice name tagged thereto;

when the at least one content and the at least one UI object are selected, tagging the voice name tagged to the selected UI object to the selected content;

storing the voice name tagged content in a memory of the mobile terminal;

inputting a voice for a search for a specific content via a microphone of the mobile terminal;

analyzing a meaning of the inputted voice;

searching the memory for at least one content to which a voice name having a meaning associated with the analyzed voice is tagged; and displaying the searched at least one content.

* * * * *